United States Patent
Jung

(10) Patent No.: US 9,830,073 B2
(45) Date of Patent: Nov. 28, 2017

(54) GESTURE ASSISTIVE ZOOMABLE SELECTOR FOR SCREEN

(71) Applicant: Alpine Electronics, Inc., Tokyo (JP)

(72) Inventor: Inchang Jung, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 288 days.

(21) Appl. No.: 14/569,085

(22) Filed: Dec. 12, 2014

(65) Prior Publication Data

US 2016/0170491 A1 Jun. 16, 2016

(51) Int. Cl.
- *G06F 3/01* (2006.01)
- *G06F 3/0481* (2013.01)
- *G06F 3/0484* (2013.01)
- *G06F 3/0488* (2013.01)

(52) U.S. Cl.
CPC ........ *G06F 3/04883* (2013.01); *G06F 3/0488* (2013.01); *G06F 2203/04806* (2013.01)

(58) Field of Classification Search
CPC ........... G06F 3/017; G06F 3/011; G06F 3/048
See application file for complete search history.

(56) References Cited

U.S. PATENT DOCUMENTS

| | | | |
|---|---|---|---|
| 8,230,367 B2 | 7/2012 | Bell et al. | |
| 2008/0059915 A1* | 3/2008 | Boillot | G06F 3/0346 715/863 |
| 2013/0155237 A1* | 6/2013 | Paek | G06F 1/1632 348/148 |
| 2014/0035805 A1* | 2/2014 | Minnen | G06F 3/017 345/156 |
| 2014/0223385 A1* | 8/2014 | Ton | G06F 3/0488 715/863 |
| 2014/0365935 A1* | 12/2014 | Moha | G06F 3/04815 715/769 |
| 2015/0135132 A1* | 5/2015 | Josephson | G06F 3/0482 715/784 |
| 2016/0162082 A1* | 6/2016 | Schwesinger | G02B 27/017 345/173 |

FOREIGN PATENT DOCUMENTS

JP 2013-225789 10/2013

* cited by examiner

*Primary Examiner* — Sang Kim
(74) *Attorney, Agent, or Firm* — Muramatsu & Associates

(57) ABSTRACT

A method of pointing a first object on a screen of an infotainment system is provided. The first object on the screen is displayed on the screen and, a location of a second object related to a user and a first predetermined gesture executed by the second object by one or more sensors can be detected. Coordinates of a center of the first object on the screen can be calculated based on the detected location of the second object where the coordinates cause a distance between the center of the first object and the second object substantially minimum, and a size of the first object associated with a distance between the detected location of second object and the screen is calculated. The first object with the calculated size at the calculated coordinates is displayed on the screen.

18 Claims, 22 Drawing Sheets

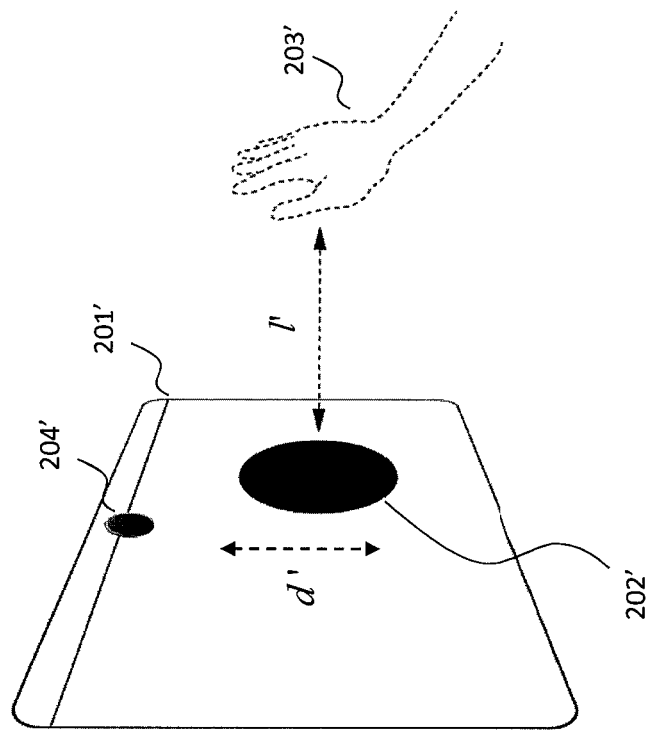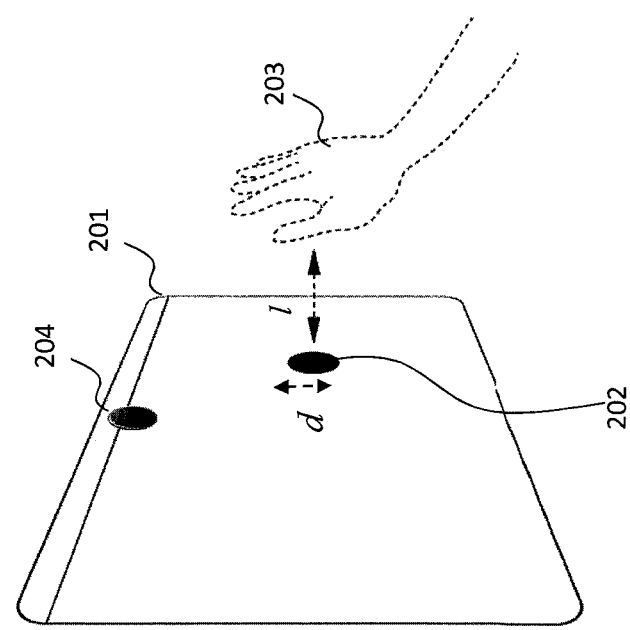
FIG. 2(b)

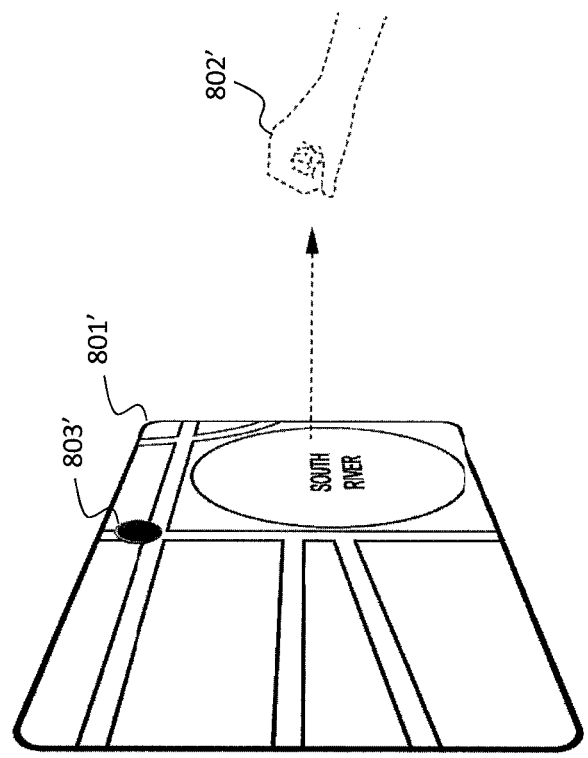
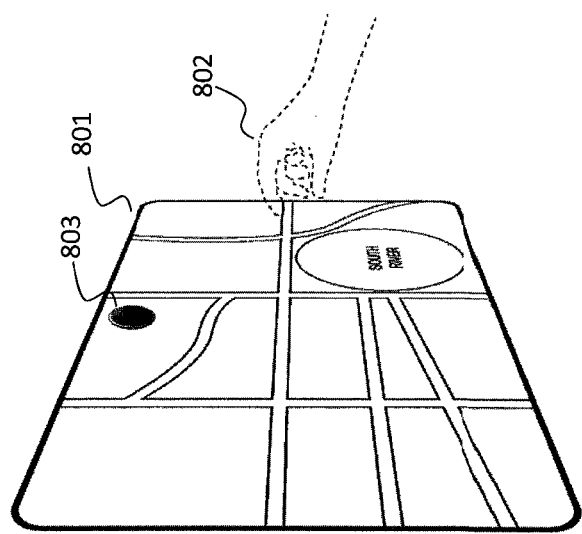
FIG. 8

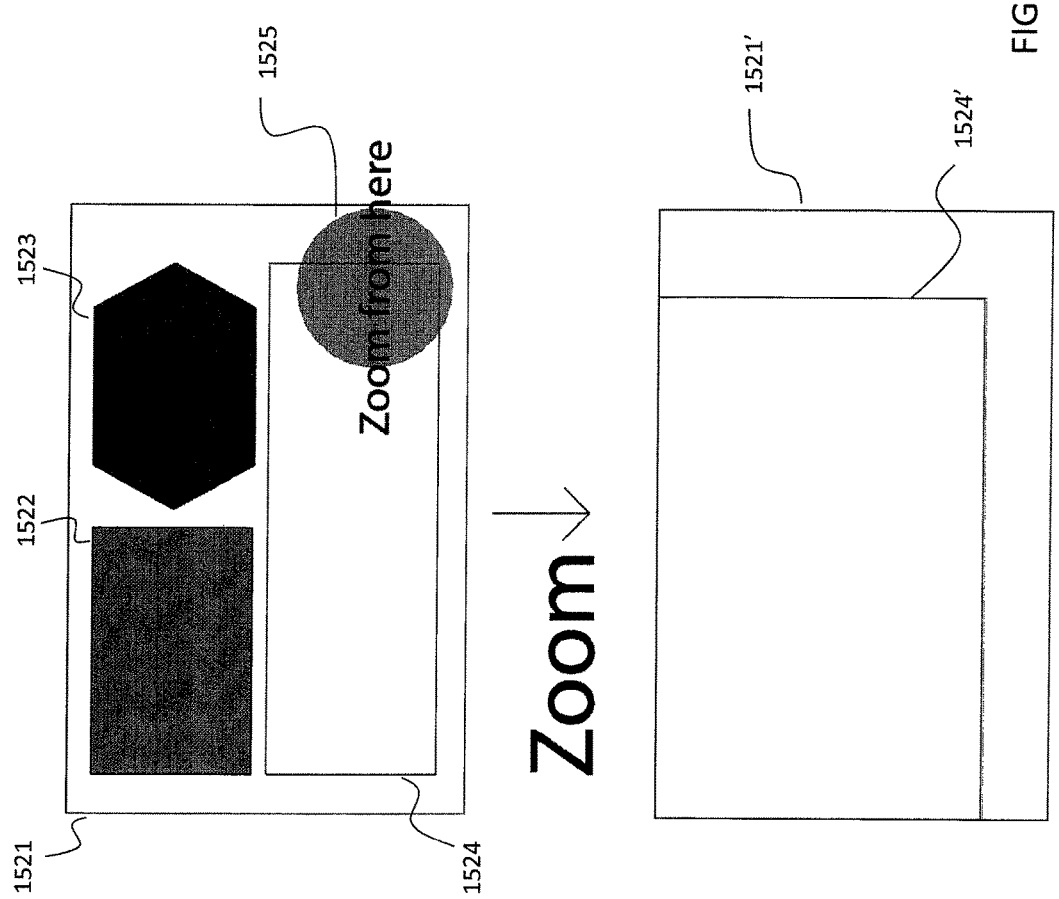

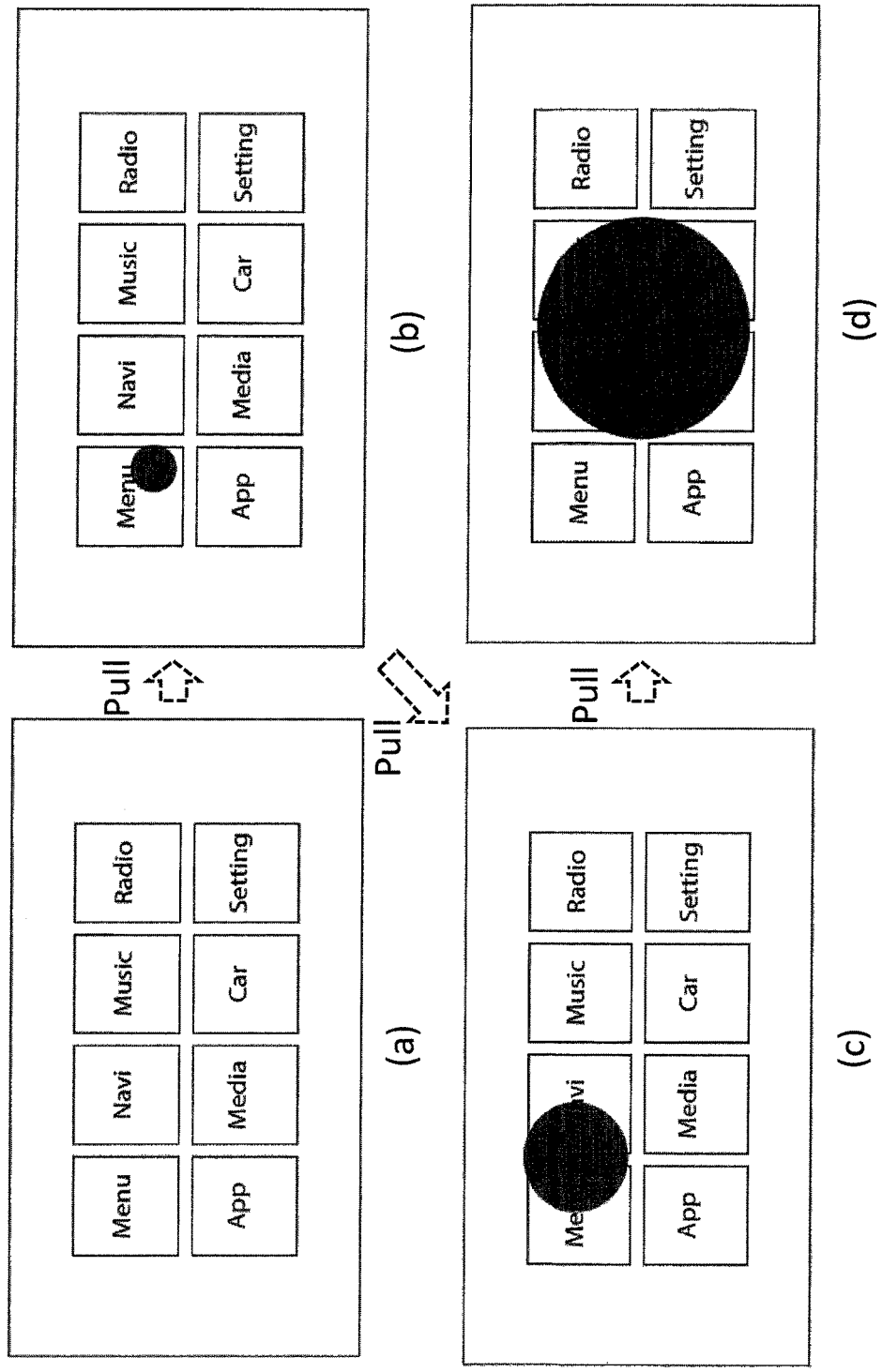

GESTURE ASSISTIVE ZOOMABLE SELECTOR FOR SCREEN

BACKGROUND

1. Field

The present disclosure generally relates to interactive graphical user interface for vehicle infotainment systems. More specifically, embodiments in the present disclosure relate to user interface for reflecting user interaction in a three-dimensional environment into graphical interface particularly pointing to a certain region in a screen of a vehicle infotainment system while a user is driving a vehicle.

2. Description of the Related Art

In the vehicle, drivers tend to feel gesture user interface (UI) is cumbersome in order to control a vehicle infotainment system while driving. While it is possible to keep a smartphone in a stable condition with regard to an object such as a hand of the user which results in stability of gesture control and operation, users often find difficult to control gesture motions in a vehicle in order to control functions of the vehicle infotainment system by gesture interaction with regards to a screen of the vehicle infotainment system, because it is difficult to keep gesture interaction as a fixed motion with regards to the screen due to instability and vibration in the vehicle. Additionally, the users, especially the drivers, need to focus most of their driving time on a road rather than the screen and time to focus and to aim target objects in the screen is substantially limited which results in adding inaccuracy in gesture operation.

In past, several attempts of gesture control methods have been explored and proposed. For example, U.S. Pat. No. 8,230,367 suggests that it is possible to provide function control with gesture by allowing a user to choose from different levels of selection corresponding with a distance between an object of a user (e.g. a hand of a user) and a body of the user. However, this method requires one or more sensors to measure a distance between the object and the body, which means that two points need to be measured. In such unstable mobile environment like in a vehicle, measurements of two points tend to result in inaccuracy because of measurement errors at two points. Further, relying on the distance of the object and the body does not provide the driving user to point a particular object on a screen of a vehicle infotainment system.

Accordingly, there is a need to provide user interface which improves assisting accurate control of functions of a vehicle infotainment system within limited time for minimizing distraction while driving. In particular, more accurate pointing method which allows a driver to narrow down a region the driver wishes to point from the entire screen is needed while a vehicle is in action and the driver has limited time to focus on the screen.

SUMMARY

In one aspect, a method of pointing a first object on a screen of an infotainment system is provided. This method includes displaying the first object on the screen, detecting a location of a second object related to a user and a first predetermined gesture executed by the second object by one or more sensors and calculating coordinates of a center of the first object on the screen based on the detected location of the second object, wherein the coordinates are configured to cause a distance between the center of the first object and the second object substantially minimum. A size of the first object associated with a distance between the detected location of second object and the screen is calculated, and the first object with the calculated size at the calculated coordinates is displayed on the screen.

In another aspect, an infotainment system that allows a user to point a first object on a screen is provided. The infotainment system includes a screen which displays the first object on the screen, one or more gesture sensor that detects a location of a second object related to a user and a first predetermined gesture executed by the second object, and a processor that calculates coordinates of a center of the first object on the screen based on the detected location of the second object, wherein the coordinates are configured to cause a distance between the center of the first object and the second object substantially minimum. The processor further calculates a size of the first object associated with a distance between the detected location of second object and the screen and displays the first object with the calculated size at the calculated coordinates on the screen.

In one embodiment, the first object is a pointer. In another embodiment, the first object is an object of interest comprising one or more target objects. In another embodiment, the first object is a region of interest and the size of the first object is associated with a display scale of the region of interest. In another embodiment, the first object is a combination of a pointer and a region of interest, and the size of the first object is associated with a combination of a size of the pointer and a display scale of the region of interest.

In one embodiment, at least one of the one or more sensors is a gesture sensor. The gesture sensor may be at least one of a camera, a proximity sensor, such as a projected capacitive touch sensor without direct touch, photoelectric sensor, thermo-sensor, radar, ultrasonic sensor, a gyro and an accelerometer, attached to or remotely located from the screen. Furthermore, the gesture sensors may further detect a second predetermined gesture as a confirmation of a function to be executed. In addition, the function to be executed is a selection of a portion of the first object, further includes selecting the portion of the first object. It is possible that a selection of one object is achieved by repetition of allowing a user to select the portion of the first object according to gesture change of the user.

The above and other aspects, objects and advantages may best be understood from the following detailed discussion of the embodiments.

BRIEF DESCRIPTION OF THE DRAWINGS

FIG. 8 illustrate one embodiment of the infotainment system in the vehicle with a screen zoom function including perspective views, respectively, depending on a distance between the screen and a gesture object.

FIGS. 15(a)-(c) illustrate examples of a screen zoom function according to one embodiment.

FIGS. 16-19 illustrate examples of a focus zoom function according to one embodiment.

DETAILED DESCRIPTION OF THE PREFERRED EMBODIMENTS

Various embodiments for the method and system of pointing an object in a screen will be described hereinafter with reference to the accompanying drawings. Unless defined otherwise, all technical and scientific terms used herein have the same meaning as commonly understood to one of ordinary skill in the art to which present disclosure belongs.

Although the description will be made mainly for the case where the method and system of pointing an object on a screen in a vehicle, any methods, devices and materials similar or equivalent to those described, can be used in the practice or testing of the embodiments. All publications mentioned are incorporated by reference for the purpose of describing and disclosing, for example, the designs and methodologies that are described in the publications which might be used in connection with the presently described embodiments. The publications listed or discussed above, below and throughout the text are provided solely for their disclosure prior to the filing date of the present disclosure. Nothing herein is to be construed as an admission that the inventors are not entitled to antedate such disclosure by virtue of prior publications.

In general, various embodiments of the present disclosure are related to pointing an object on a screen in a vehicle. Furthermore, the embodiments may be related to an infotainment system including a display interface device, e.g. a screen, in a vehicle where the display interface device allows a user to point an object on a screen under a mobile environment where pointing an object on the display interface device in a stable manner tends to be difficult because attention of the user to the display interface device is limited and the mobile environment is not stable due to vibration.

Figure 1:
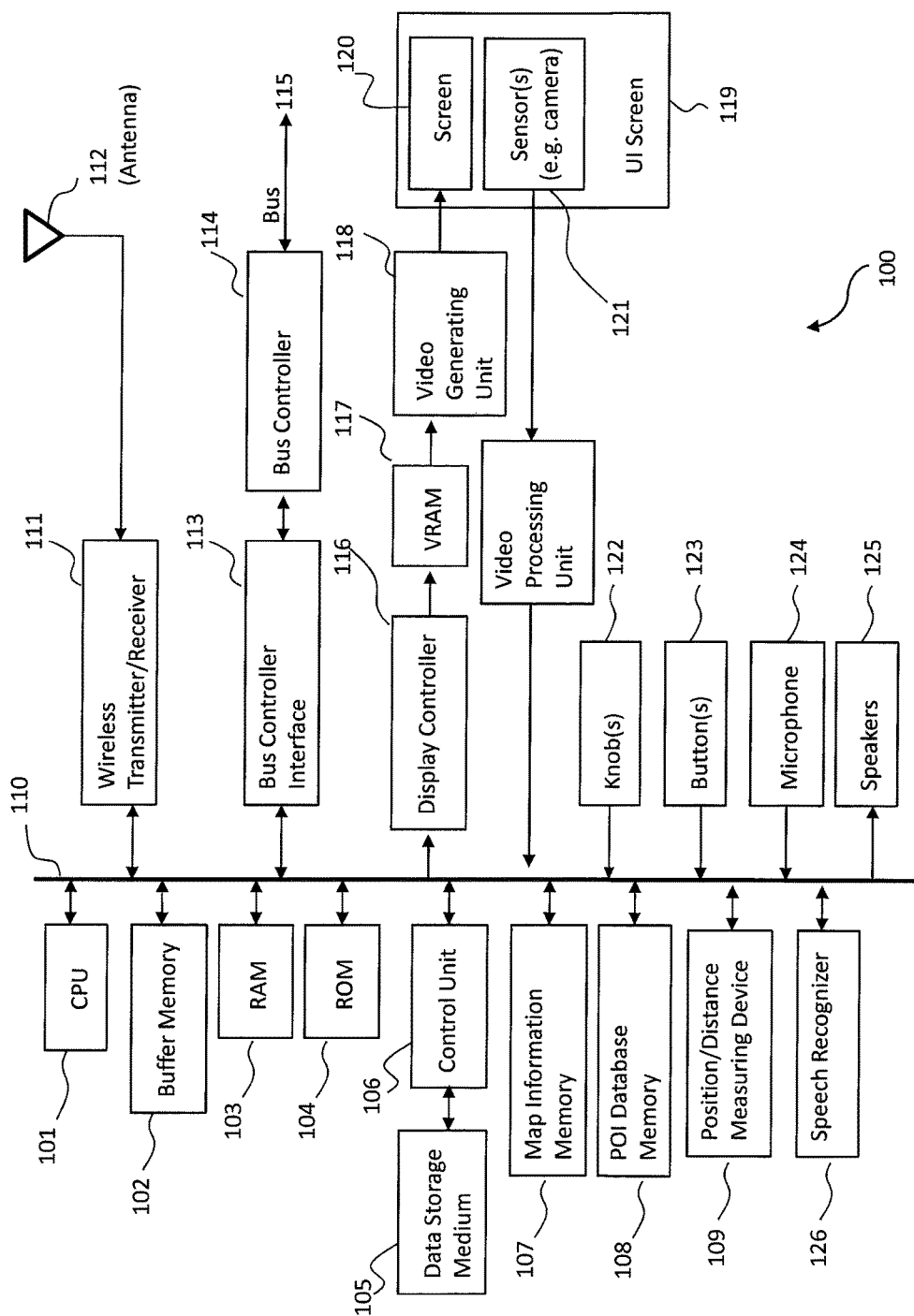
FIG. 1 is a block diagram of an infotainment system in a vehicle including a UI screen having a screen and one or more sensor therein, which enables the infotainment system to react to gesture of a user according to some embodiments.

FIG. 1 is a block diagram of an infotainment system in a vehicle including a display interface device that executes a method for pointing an object on a screen in a vehicle under a mobile environment according to one embodiment. Note that the block diagram in FIG. 1 is merely an example according to one embodiment for an illustration purpose and not intended to represent any one particular architectural arrangement. The various embodiments can be applied to other type of on-vehicle infotainment system implemented by a vehicle head unit or any mobile infotainment system. For example, the vehicle infotainment system 100 includes a central processor unit (CPU) 101 for controlling an overall operation of the infotainment system, a buffer memory 102 for temporally storing data such as current user interface related data for efficient handling user inputs in accordance with this disclosure, a random access memory (RAM) 103 for storing a processing result, and a read only memory (ROM) 104 for storing various control programs, such as a user interface control program and an audio visual media and navigation control program, necessary for infotainment system control of this disclosure. The CPU 101 controls an overall operation of the infotainment system 100 including receiving entries of a user, processing the entries, displaying interaction to the user accordingly, selecting a content or control item from either a medium, a connected device, or a broadcast signal and presenting the content or control item to the user.

The infotainment system 100 also includes a data storage medium 105 such as a hard disk in a hard disk drive (HDD), a flash memory in a solid state drive (SSD) or universal serial bus (USB) key memory, a compact disc-read only memory (CD-ROM), a digital versatile disc (DVD) or other storage medium for storing navigation and entertainment contents such as map information, music, video etc. The infotainment system also includes a control unit 106 for controlling an operation for reading the information from the data storage medium 105. The infotainment system 100 may include or have access to a position/distance measuring device 109 in a vehicle and either inside or at proximity of the infotainment system 100, for measuring a present vehicle position or user position, which may be associated with a preset table. For example, the position measuring device 109 has a vehicle speed sensor for detecting a moving distance, a gyroscope for detecting a moving direction, a microprocessor for calculating a position, a global positioning system (GPS) received for receiving and analyzing GPS signals, etc., and each connected by an internal bus system 110.

The infotainment system 100 may further include a map information memory 107 for storing a portion of the map data relevant to ongoing operations of the infotainment system 100 which is read from the data storage medium 105, a point of interest (POI) database memory 108 for storing database information such as POI information which is read out from the data storage medium 105.

The infotainment system 100 accommodates a plurality of means for receiving user inputs. For example, the infotainment system 100 may include a bus controller 114 for coupling to an external device via an external bus 115 (e.g.

Universal Serial Bus, etc.) and a bus controller interface 113 for handling received data from the external device. In one embodiment, the external bus 115 may be a vehicle bus used for receiving user inputs from a vehicle proprietary interface such as buttons or a touch pad on a steering wheel that accepts one or more user touch gesture operations. Furthermore, the infotainment system 100 may include a wireless transmitter/receiver 111. Using the wireless transmitter/receiver 111 via antenna 112, the infotainment system 100 may communicate with external devices inside the vehicle, external devices surrounding vehicles, remote servers and networks, etc.

In one embodiment, the infotainment system 100 includes a user interface (UI) screen 119 having a screen 120 which may present a natural view as an interface to a user and one or more sensors 121 for detecting a gesture entry by the user. These one or more sensors 121 may be cameras, infrared, supersonic, or any sensors which can detect gesture related to interaction with the infotainment system 100. Alternatively, as seen in a traditional vehicle entertainment system, knobs 122 and buttons 123 may be included in the infotainment system 100 for accommodating entries by a user. To accommodate hands-free input operation to avoid driver distraction, it may be appropriate to use voice commands as user inputs for the infotainment system 100. To accommodate such voice commands, a microphone 124 for receiving speech input may be included.

The vehicle infotainment system 100 may also include a plurality of means to output an interactive result of user input operations. For example, the infotainment system 100 may include a display controller 116 for generating images, such as tuning preset table images, as well as menu related images related to the infotainment system control information and some of these generated images may be stored in a video RAM (VRAM) 117. The images stored in the VRAM 117 are sent to a video generating unit 118 where the images are converted to an appropriate format to be displayed on the screen 120 of the UI screen 119. Upon receipt of video data, the screen 120 displays the image. Alternatively, to keep eyes of a driving user on a road rather than prompting the driving user to look into the screen, the interactive output may be presented to the driving user as audio feedback via one or more speakers 125.

An internal bus system 110 may include one or more busses connected to each other through various adapters, controllers, connectors, etc., and the devices and units of the infotainment system 100 mentioned above may be coupled to each other via the internal bus system 110.

Depending on a context, such as whether the infotainment system 100 is in a navigation mode, entertainment mode, information access mode, control mode, etc., the infotainment system 100 expects a gesture operation as an entry from a user. Here, the user's eyes tend to be on a road ahead and around of the vehicle that the user is driving, the user can have very short time to pay attention to the UI screen 119 of the infotainment system 100.

Figure 2A:
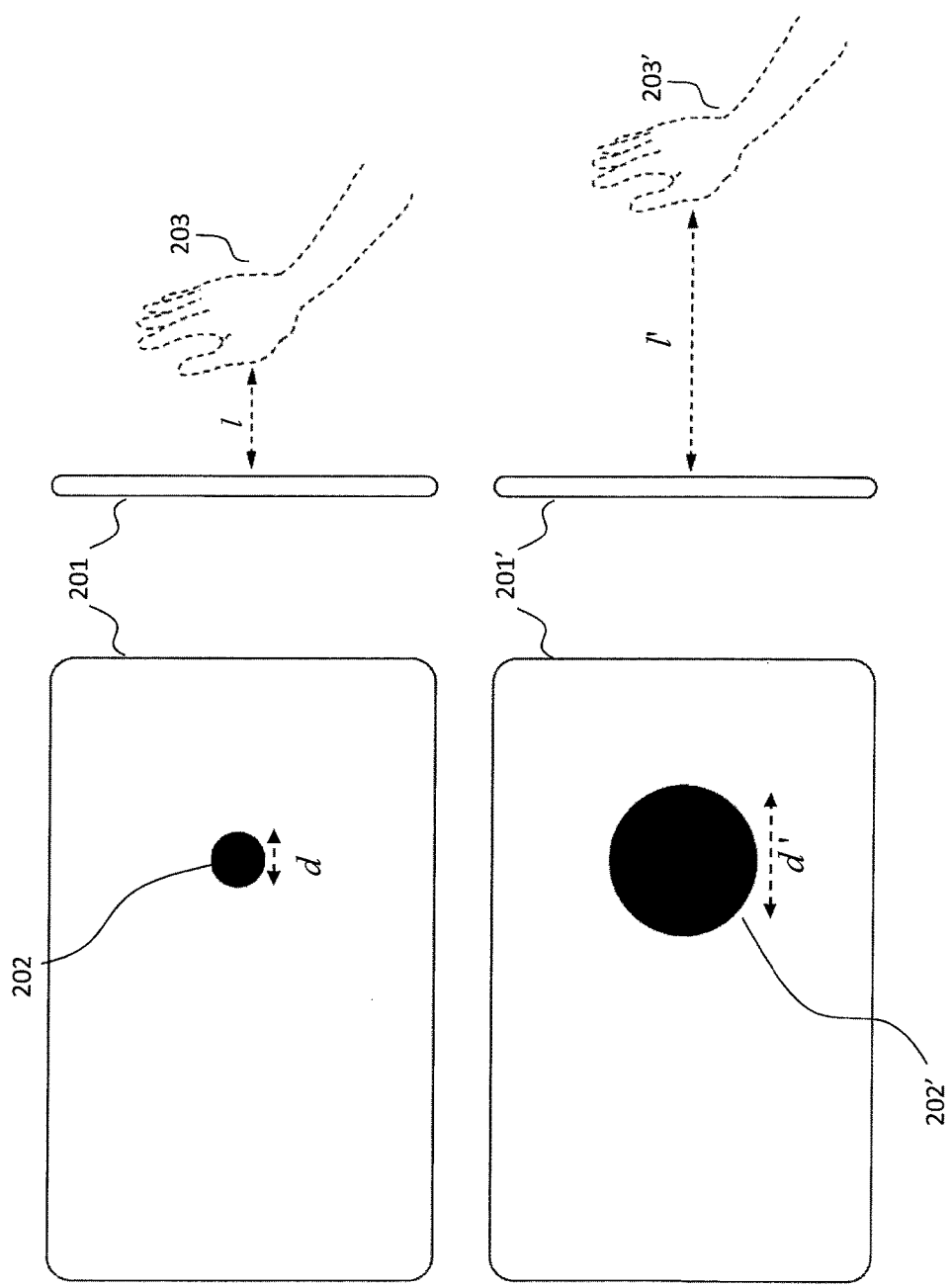
FIGS. 2(a) and (b) illustrate one embodiment of the infotainment system in the vehicle with a focus zoom function, including front and side views and perspective views, respectively, depending on a distance between the screen and a gesture object.

FIGS. 2(*a*) and 2(*b*) illustrate one embodiment of an infotainment system which allows a user to point an object on a screen and the user, in particular, depicting relationships between a size of a pointer on the screen and a distance between the screen and a hand pointing the screen based on two different distances. FIG. 2(*a*) includes front views and side views of the screen relative to the hand and FIG. 2(*b*) includes perspective views of the screen relative to the hand. As shown in FIGS. 2(*a*) and (*b*), a pointer 202 is displayed on a screen 201. When a distance between an object 203 and the screen 201 is l, a diameter of the pointer 202 is d. When a distance between an object 203' and a screen 201' becomes l', which is longer than l, a diameter of a pointer 202' becomes d' which is also longer than d accordingly. In FIGS. 2(*a*) and (*b*), the sample object is a hand of a user. However, it is possible that any object which is able to reflect the user's intent to control the pointer may be used as the object 203. For example, as shown in FIG. 2(*b*), if the object 203 is a user's open hand, the gesture that "the hand is open" is recognized by one or more sensors, such as a camera 204, of an infotainment system and the infotainment system is able to determine that the position of the object 203. Thus the infotainment system is able to display the pointer 202 at a position on the screen 201 corresponding with a horizontal and vertical position of the object 203 with a diameter d corresponding with the distance l between the object 203 and the screen 201.

Figure 3:
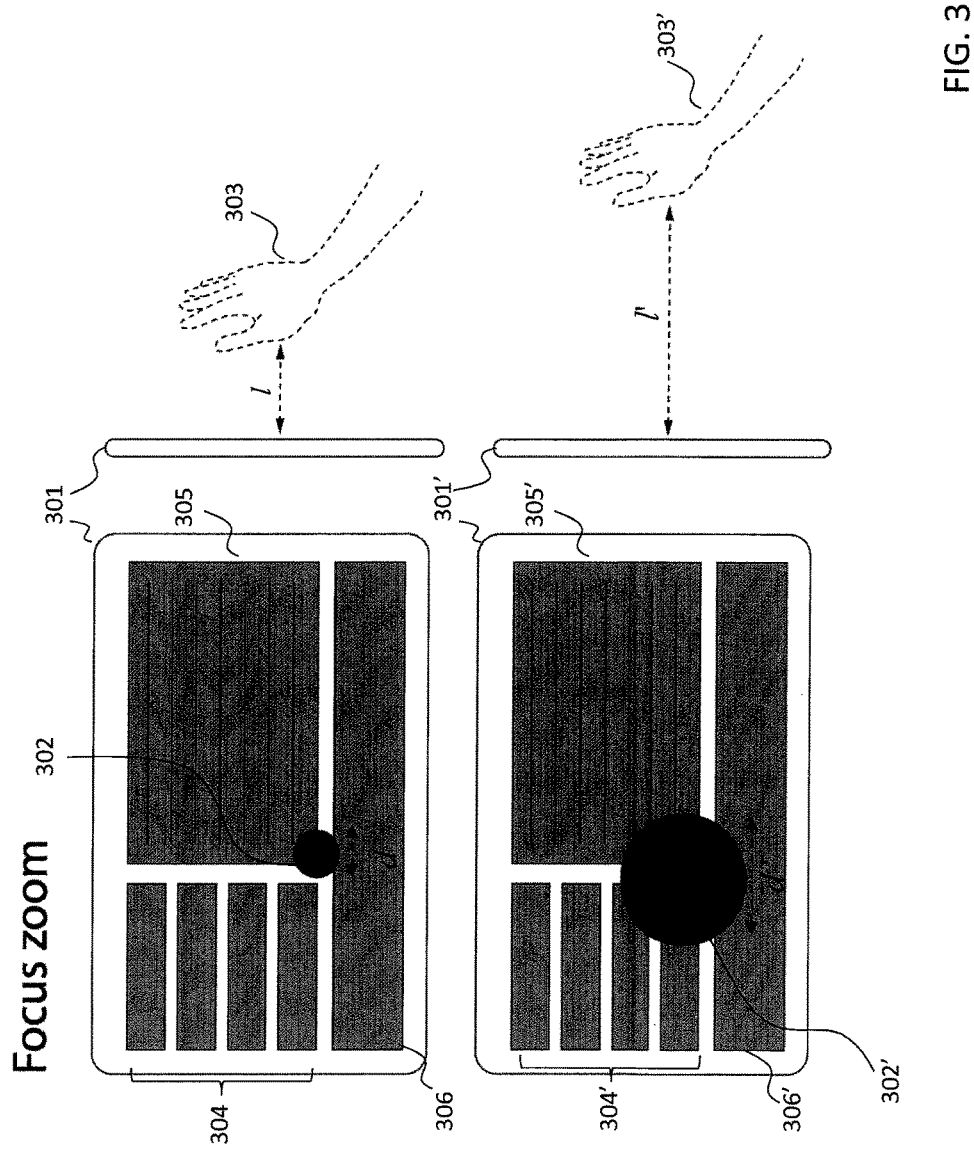
FIG. 3 illustrates front and side views of one embodiment of the infotainment system in the vehicle with a focus zoom function on a menu, depending on a distance between the screen and a gesture object.

FIG. 3 includes front views and side views of an example menu screen of one embodiment of an infotainment system with a focus zoom function which allows a user to point an object on a menu screen, in particular, depicting relationships between a size of a pointer on the screen and a distance between the screen and a hand pointing the screen based on two different distances. As shown in FIG. 3, a pointer 302 is displayed on a menu screen 301. When a distance between an object 303 and the menu screen 301 is l, a diameter of the pointer 302 is d. When a distance between an object 303' and a screen 301' becomes l', which is longer than l, a diameter of a pointer 302' becomes d' which is also longer than d accordingly. In FIG. 3, the sample object is a hand of a user, however, it is not limited to the user's hand. For example, if the object 303 is a user's open hand, the gesture that "the hand is open" is recognized by one or more sensors, such as a camera (see FIG. 2(*b*)) of an infotainment system and the infotainment system interprets the gesture as an intention of the user to control the size of the pointer 302 and is able to determine that the position of the object 303. Thus the infotainment system is able to display the pointer 302 at a position on the menu screen 301 corresponding with a horizontal and vertical position of the object 303 with a diameter d corresponding with the distance l between the object 303 and the screen 301. As shown in FIG. 3, the pointer 302 with the diameter d is on an item 305 on the right and an item 306 at the bottom of the screen 301, when a distance between the object 303 and the screen 301 is l. When the distance between an object 303' and a screen 301' becomes l', the diameter of the pointer 302' becomes d' and is able to be on an item 304' on the left, an item 305' on the right and an item 306' at the bottom of the screen 301'. Thus, by controlling the distance of the object from the menu screen, it is possible to control a size of a pointer corresponding to a coverage region of the pointer including potential selection items and to select a plurality of items in the menu with a simple gesture unlike typical cursors which allow a user to select one item with such a gesture.

Figure 4:
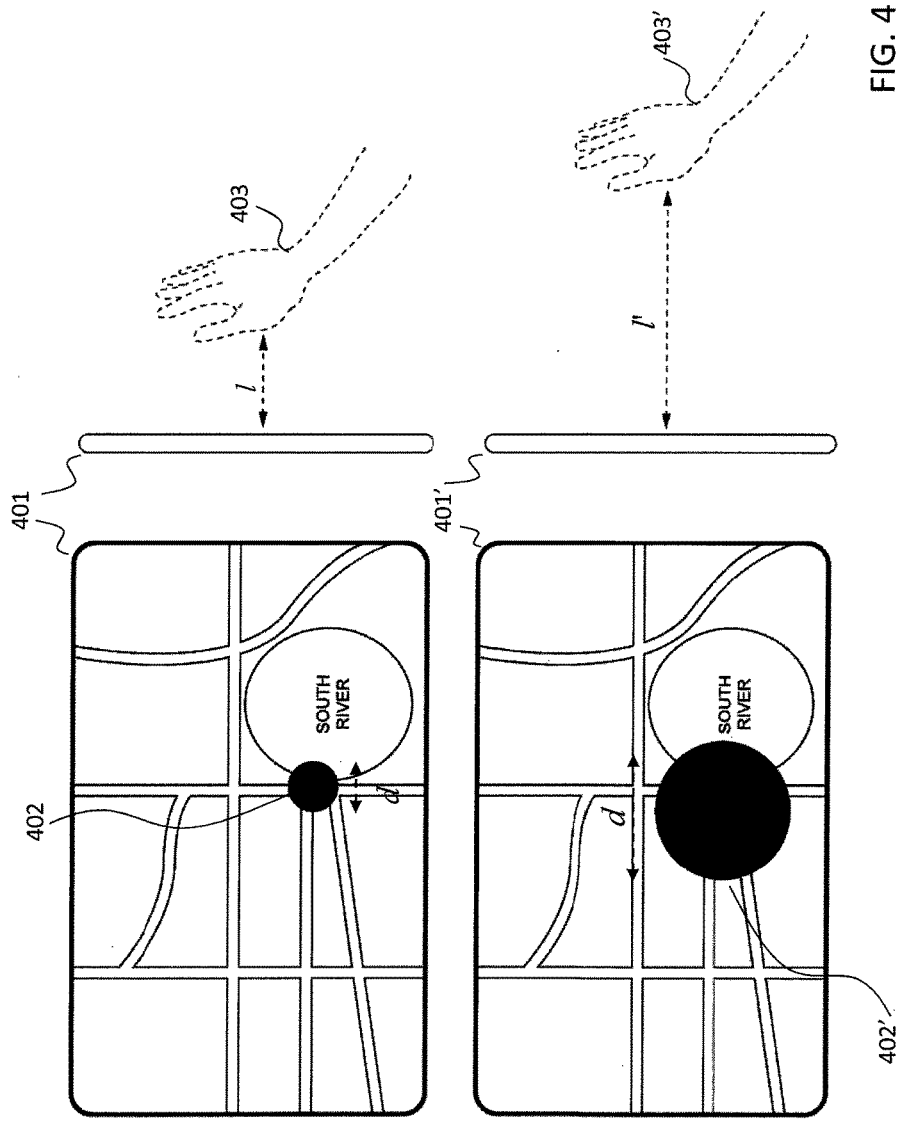
FIG. 4 illustrates front and side views of one embodiment of the infotainment system in the vehicle with a focus zoom function on a map, depending on a distance between the screen and a gesture object.

FIG. 4 includes front views and side views of an example map screen of one embodiment of an infotainment system with a focus zoom function which allows a user to point an object on a map screen, in particular, depicting relationships between a size of a pointer on the screen and a distance between the screen and a hand pointing the screen based on two different distances. As shown in FIG. 4, a pointer 402 is displayed on a map screen 401. When a distance between an object 403 and the map screen 401 is l, a diameter of the pointer 402 is d. When a distance between an object 403' and a map screen 401' becomes l', which is longer than l, a diameter of a pointer 402' becomes d' which is also longer than d accordingly. In FIG. 4, the sample object is a hand of a user, however, it is not limited to the user's hand. For example, if the object 403 is a user's open hand, the gesture that "the hand is open" is recognized by one or more sensors, such as a camera, of an infotainment system (see FIG. 2(b)) and the infotainment system interprets the gesture as an intention of the user to control the size of the pointer 402 and is able to determine that the position of the object 403. Thus the infotainment system is able to display the pointer 402 at a position on the map screen 401 corresponding with a horizontal and vertical position of the object 403 with a diameter d corresponding with the distance l between the object 403 and the map screen 401. As shown in FIG. 4, the pointer 402 with the diameter d covers SOUTH RIVER and one intersection on its left, when a distance between the object 403 and the map screen 401 is l. When the distance between an object 403' and a map screen 401' becomes l', the diameter of the pointer 402' becomes d' and is able to cover SOUTH RIVER and two intersections on its left. Thus, by controlling the distance of the object from the map screen, it is possible to control a size of a pointer corresponding to a coverage region of the pointer including potential selection region and to select a larger or smaller region in a map with a simple gesture, unlike typical cursors which allow a user to select a predetermined size of a region shown in a certain scale with such a gesture.

Figure 5:
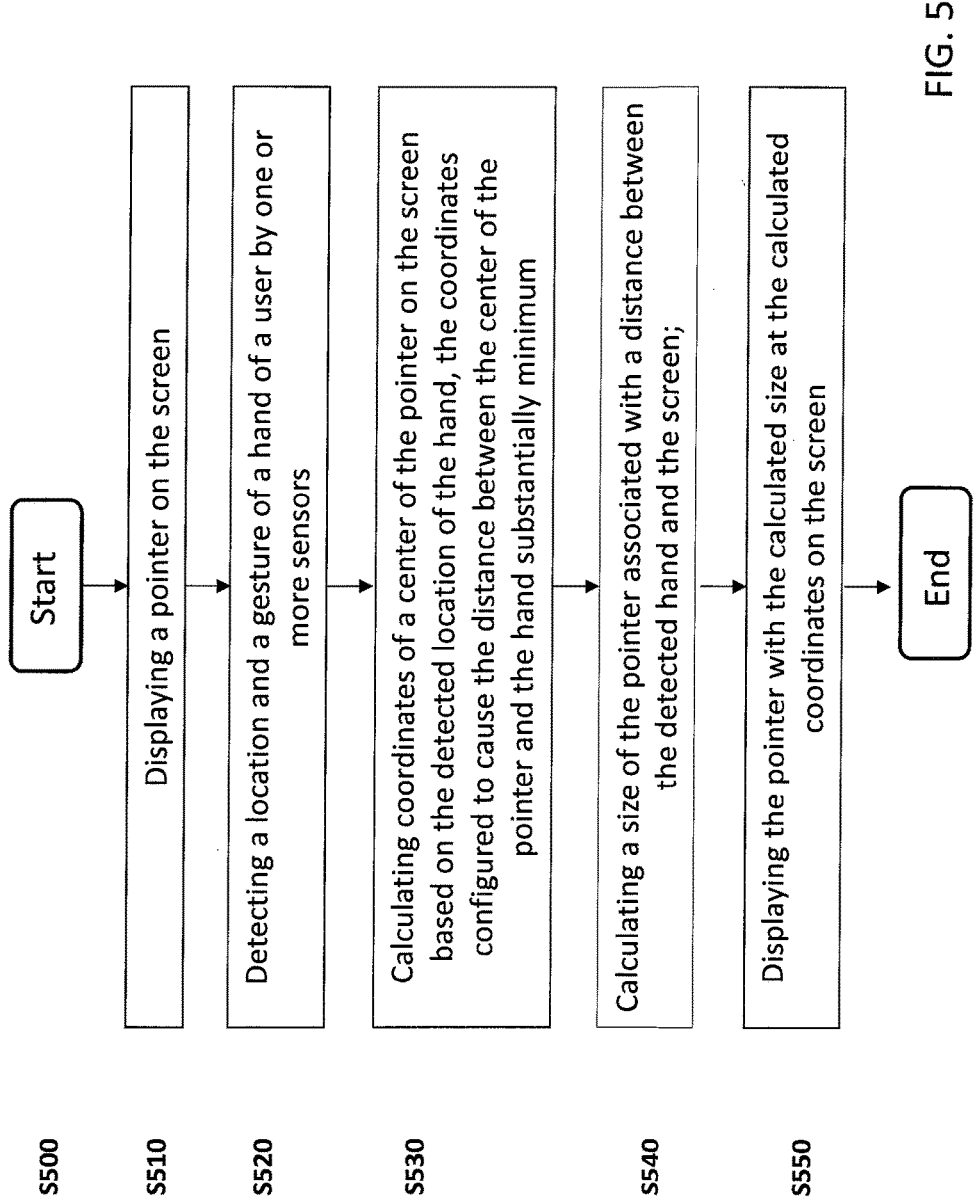
FIG. 5 is a flow chart of pointing an object on a screen according to one embodiment related to a focus zoom function.

FIG. 5 is a flow chart of a procedure of the method of pointing an object on a screen according to one embodiment related to a focus zoom function. In step S510, an infotainment system displays a first object on the screen. In this embodiment, the first object is a pointer. On the screen, whether an application is a menu as shown in FIG. 3 or a map as shown in FIG. 4, but not limited to these examples, a pointer can be overlaid on the screen. While the pointer is being displayed on the screen, the infotainment system also starts detecting a location and a gesture of a second object related to a user by at least one sensor as described in step S520. The gesture may be indicative of intent of the user to control the pointer on the screen. Typically, the object related to a user is a user's hand but any other object which can represent a gesture of the user may be used. In case of using atypical object of the user, such as a stick, a physical pointer, another part of the user's body, etc., may be used as long as the atypical object is somehow registered or sensed for learning by the sensor prior to its actual use. The at least one sensor can be either a camera, or a proximity sensor, such as a projected capacitive touch sensor without direct touch, photoelectric sensor, thermo-sensor, radar, or ultrasonic sensor attached to or remotely located from the screen, a gyro and accelerometer attached to the object of the user for sensing the movement of the object for detection of relative position change, and so on. In step S530, coordinates of a center of the pointer on the screen is calculated based on the detected location of the hand or the user related object for gesture. Here, the distance between the center of the pointer and the user related object becomes substantially minimum and thus is the distance between the screen and the user related object for gesture. In step S540, a size of the pointer is also calculated in association with the distance between the detected user related object for gesture and the screen. Here, it is possible to adjust the size of the pointer based on relationship between the detected user related object for gesture and the screen, to have the size larger if the distance is longer or smaller if the distance is shorter. It is not necessary to obtain the absolute or actual distance between the detected user related object for gesture and the screen. In fact, a single camera which is able to detect whether the detected user related object is closer or farther by the fact that a size of an image of the user related object changes may be sufficient to provide the association for adjusting the size of the pointer. Through this process described, it is possible to display the pointer with the calculated size at the calculated coordinate on the screen as described in step S550. As the hand or user related object is moved and the distance with the screen changes, the same steps are executed and results as illustrated in FIGS. 3 and 4 are obtained. There is no particular order whether the pointer becomes smaller or larger, and it is possible that the movement is from the hand being closer to the screen to the hand being farther to the screen which results in having the pointer larger, or alternatively, the hand located far from the screen can be moved closer to the screen which causes the pointer to be smaller.

Figure 6:
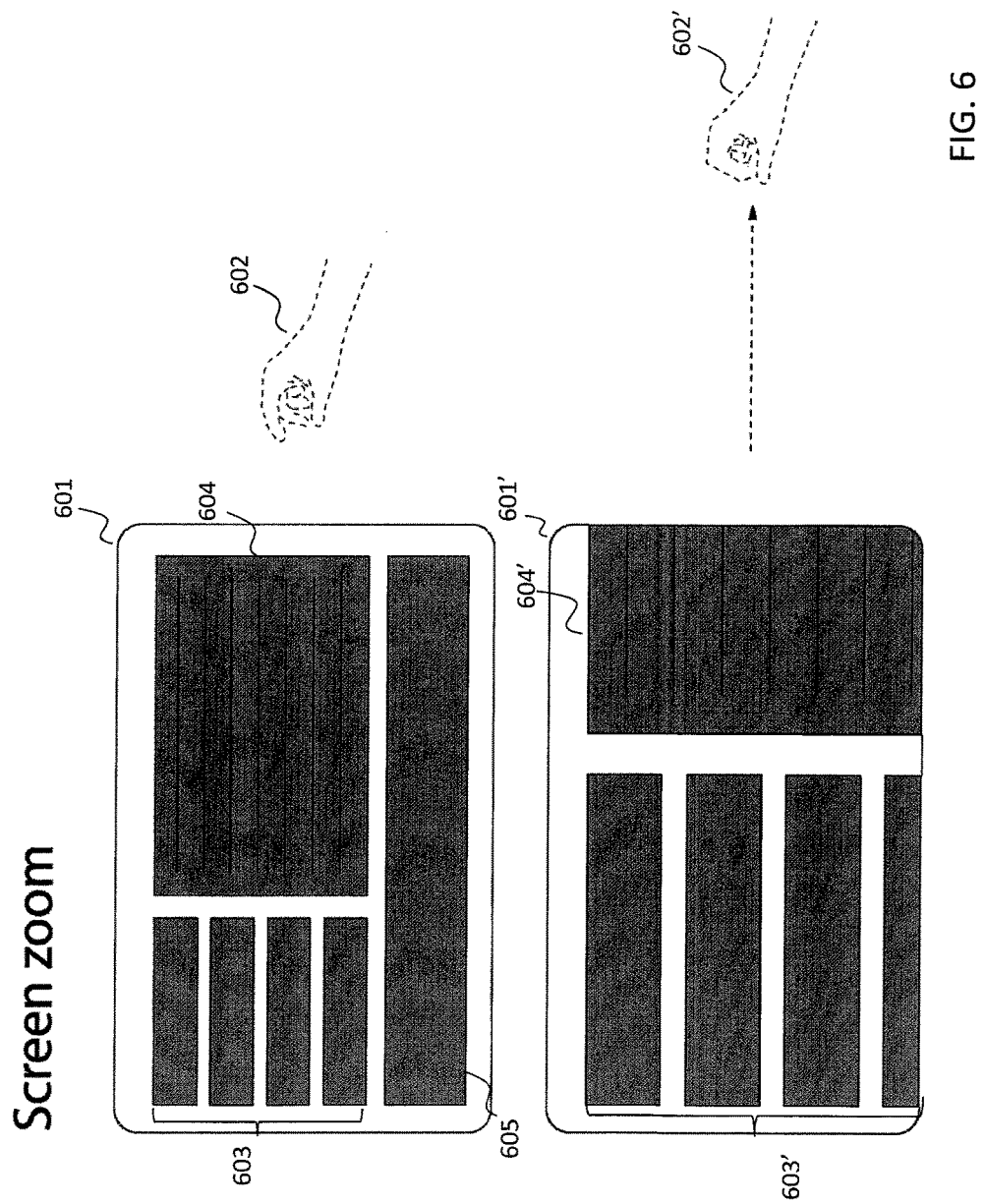
FIG. 6 illustrates combinations of front views and hand gestures of one embodiment of the infotainment system in the vehicle with a screen zoom function on a menu, depending on a distance between the screen and a gesture object.

FIG. 6 includes front views and side views of an example menu screen of one embodiment of an infotainment system with a screen zoom function which allows a user to zoom in and out a menu screen, in particular, depicting relationships between a scale of menu items on the screen and a distance between the screen and a hand pointing the screen based on two different distances. As shown in FIG. 6, menu items 603, 604, and 605 are displayed on a menu screen 601. When a user makes a predetermined gesture which confirms a location of a gesture of the object 602 to determine a region and changes a distance between an object 602' and a screen 601', the determined region is zoomed in and displayed in the screen 601'. In FIG. 6, a gesture for confirming the location of the gesture by the object is grabbing and the gesture to change the distance is moving the object backward, however, it is not limited to the above sequence of the gestures. For example, if the above predetermined gesture is recognized by one or more sensors, such as a camera, of an infotainment system (not shown), the infotainment system interprets the predetermined gesture as an intention of the user to control the scale of the menu screen 601 and is able to determine the region of zoomed in items based on the position of the object 602. Thus the infotainment system is able to display the selected region including a portion of item 603' and an item 604' on the menu screen 601' corresponding with a horizontal and vertical position of the object 602' corresponding with the distance between the object 602' and the screen 601'. Thus, by controlling the distance of the object from the menu screen, it is possible to control a region of menu items to be covered including potential selection items and to select a plurality of items in the menu with a simple sequence of gestures, such as "grabbing and moving backward", unlike typical cursors which tend to require a user to use scale bars or zoom + and − buttons away from the cursor location in order to zoom in and out the menu screen.

Figure 7:
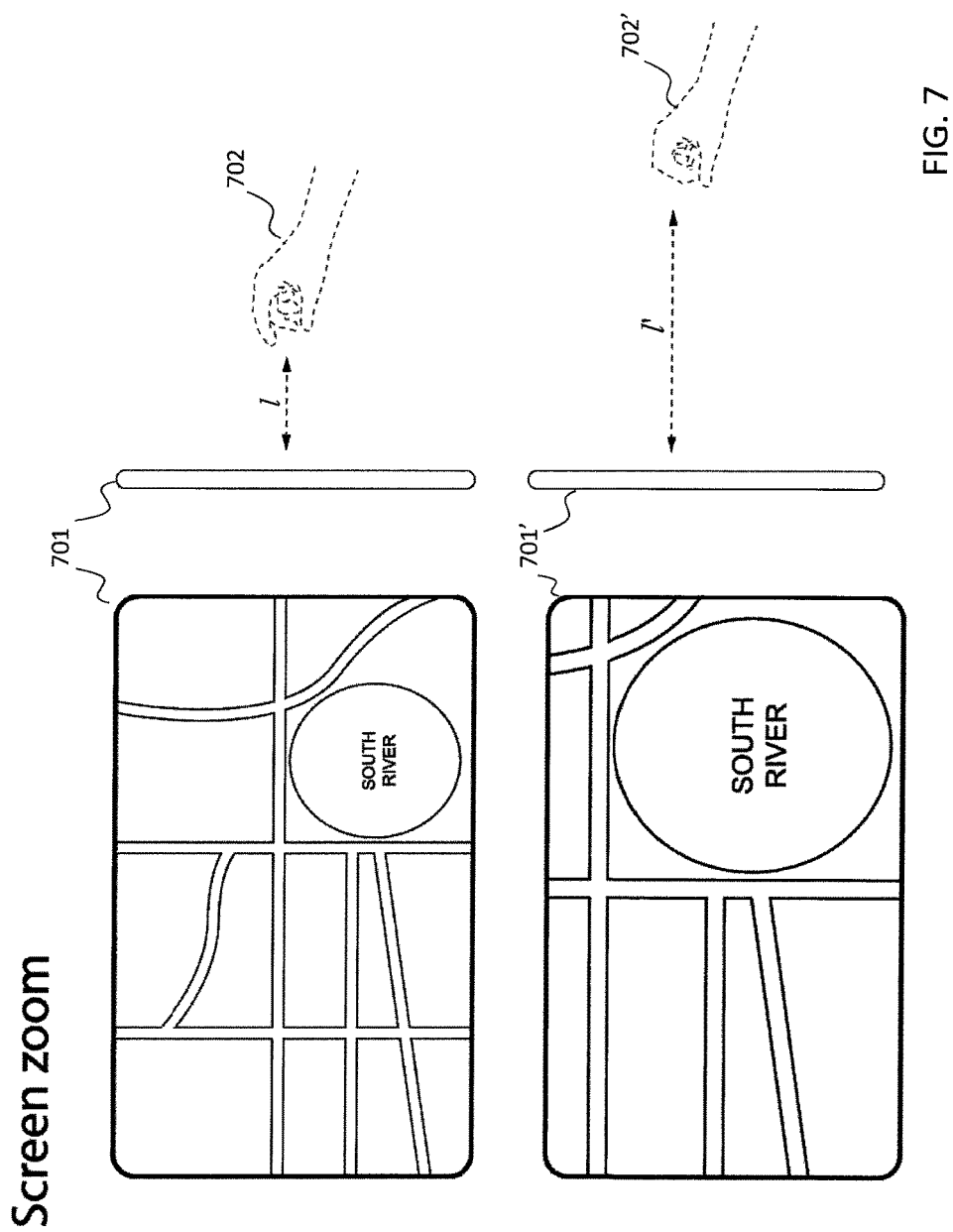
FIG. 7 illustrates combinations of front views and hand gestures of one embodiment of the infotainment system in the vehicle with a screen zoom function on a map, depending on a distance between the screen and a gesture object.

FIG. 7 includes front views and side views of an example map screen of one embodiment of an infotainment system with a screen zoom function which allows a user to zoom in and out a map screen, in particular, depicting relationships between a scale of map items on the screen and a distance between the screen and a hand pointing the screen based on two different distances. As shown in FIG. 7, map items are displayed on a map screen 701, when a distance between an object 702 and the map screen 701 is l. When a user makes a predetermined gesture which confirms a location of a gesture of the object 702 to determine a region to be zoomed in or out in the map screen 701 and changes a distance between an object 702' and a screen 701' from l to l', which is longer than l, the determined region is zoomed in and displayed in the screen 701'. In FIG. 7, a gesture for confirming the location of the gesture by the object is grabbing and the gesture to change the distance to l' is moving the object backward, however, it is not limited to the above sequence of the gestures. For example, if the above predetermined gesture is recognized by one or more sensors, such as a camera, of an infotainment system (not shown), the infotainment system interprets the predetermined gesture as an intention of the user to control the scale of the map screen 701 and is able to determine the region of zoomed in items based on the position of the object 702. Thus the infotainment system is able to display the selected region corresponding with a horizontal and vertical position of the object 702 corresponding with the distance l between the object 702' and the screen 701'. Thus, by controlling the distance of the object from the map screen, it is possible to control a map region to be covered including potential selection region and to select a larger or smaller region in a map with a simple sequence of gestures, such as "grabbing and moving backward", unlike typical cursors which tend to require a user to use scale bars or zoom + and − buttons away from the cursor location in order to zoom in and out the menu screen.

FIG. 8 includes perspective views of an example map screen of one embodiment of an infotainment system with a screen zoom function which allows a user to zoom in and out a map screen, in particular, depicting relationships between a scale of map items on the screen and a distance between the screen and a hand pointing the screen based on two different distances. In FIG. 8, a gesture for confirming the location of the gesture by the object is grabbing and the gesture to change the distance is moving the object backward, and when such a gesture is recognized by one or more sensors, such as a camera 803, of an infotainment system, the infotainment system interprets the predetermined gesture as an intention of the user to control the scale of the map screen 801 and is able to determine the region of zoomed in items based on the position of the object 802. Once the region is determined, a map screen 801' displays the map upon the predetermined gesture in a new scale according to a new distance from the map screen 801' as the camera 803' detects the new distance between a hand 802' and the map screen 801'.

Figure 9:
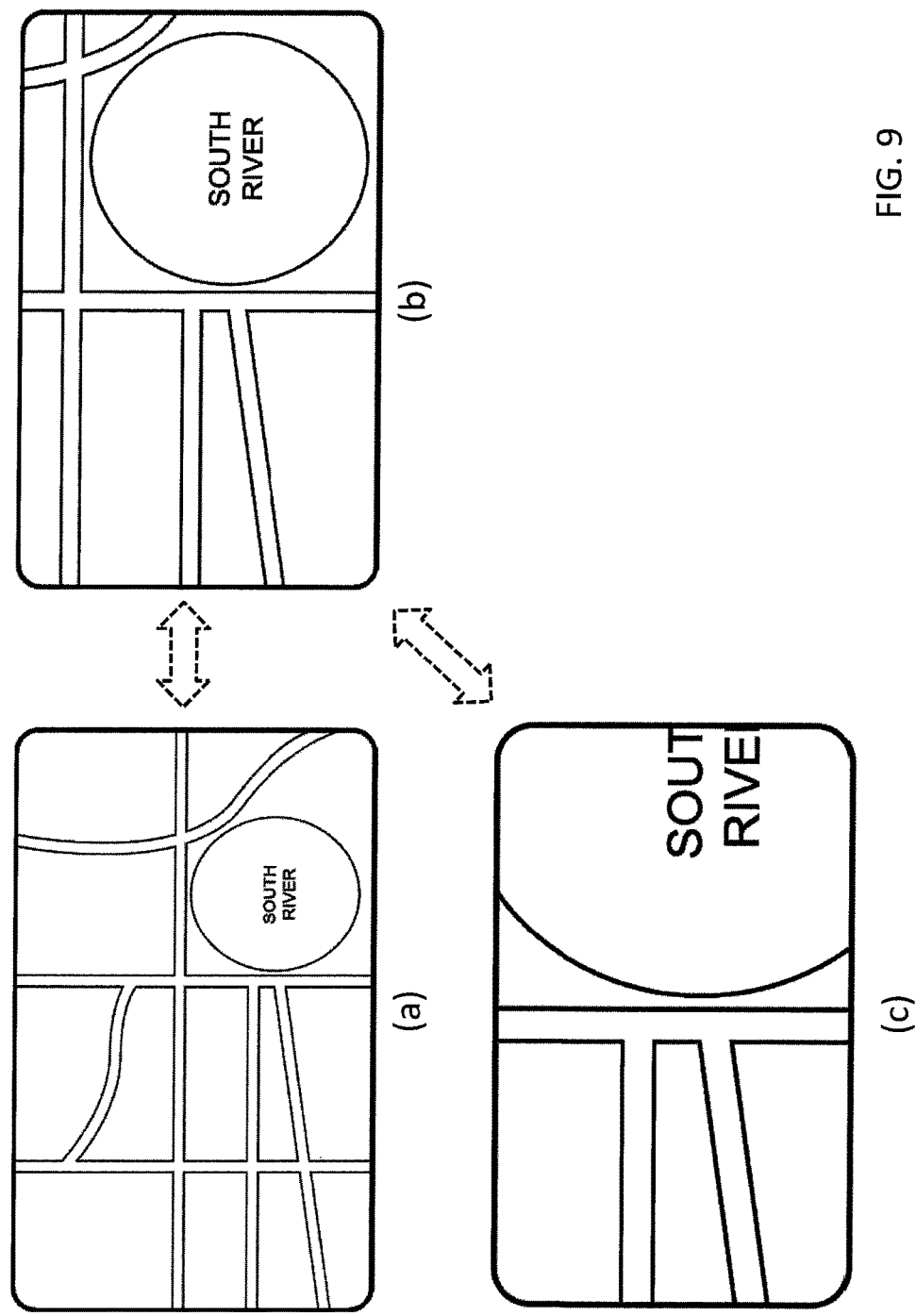
FIG. 9 illustrates a manner of pointing an object on a screen with the screen zoom function according to one embodiment.

FIG. 9 illustrates that the screen's zoom in and out function may accommodate reversible changes of a map scale in the map screen. For example, after having a sequence of gestures such as grabbing and moving a controlling object backward, the map screen will change its map scale from (a) to (b) and to (c), continually. On the other hand, after having a sequence of gestures such as grabbing and moving the controlling object forward, the map screen will change its map scale reversibly, from (c), (b) and to (a). It is possible to stop at the map scale in between (a), (b) or (c), according to a distance between the controlling object and the screen, when the gesture of moving backward or forward is paused.

Figure 10:
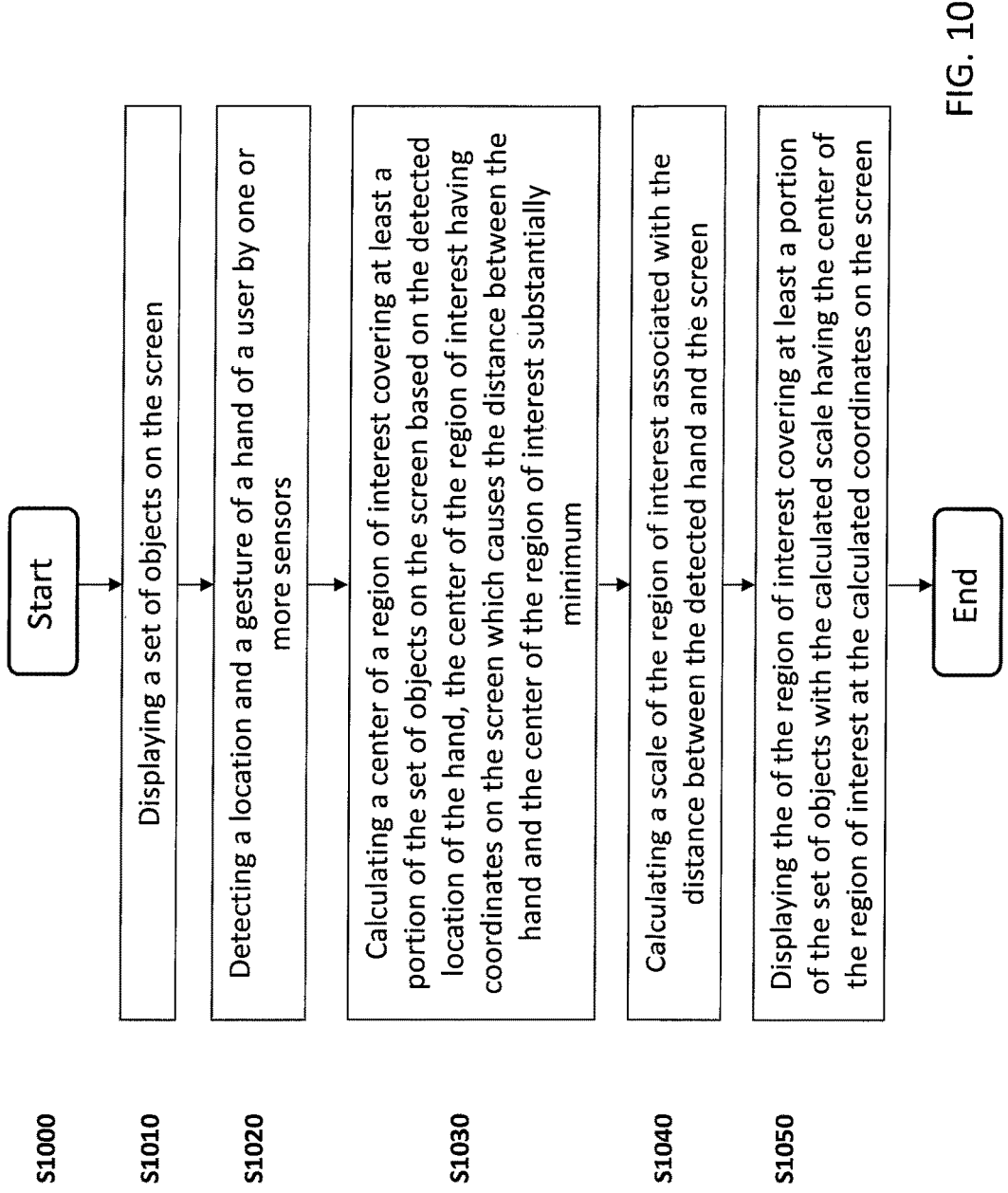
FIG. 10 is a flow chart of pointing an object on a screen according to one embodiment related to a screen zoom function.

FIG. 10 is a flow chart of a procedure of the method of pointing an object on a screen according to one embodiment related to a screen zoom function. In step S1010, an infotainment system displays objects on the screen. The objects on the screen may be menu components illustrated in FIG. 6 or map items illustrated in FIG. 7, but not limited to these examples, any display items can be overlaid on the screen. While the objects are being displayed on the screen, the infotainment system also starts detecting a location and a gesture of a second object related to a user by at least one sensor as described in step S1020. The gesture may be indicative of intent of the user to control a region of interest covering at least a portion of the set of objects on the screen. Typically, the object related to a user is a user's hand but any other object which can represent a gesture of the user may be used. In case of using atypical object of the user, such as a stick, a physical pointer, another part of the user's body, etc., may be used as long as the atypical object is somehow registered or sensed for learning by the sensor prior to its actual use. The at least one sensor can be either a camera, or a proximity sensor, such as a projected capacitive touch sensor without direct touch, photoelectric sensor, thermosensor, radar, or ultrasonic sensor attached to or remotely located from the screen, a gyro and accelerometer attached to the object of the user for sensing the movement of the object for detection of relative position change, and so on. In step S1030, coordinates of a center of the region of interest is calculated based on the detected location of the hand or the user related object for gesture. Here, the distance between the center of the region of interest and the user related object becomes substantially minimum and thus is the distance between the screen and the user related object for gesture. In step S1040, a scale of the region of interest is also calculated in association with the distance between the detected user related object for gesture and the screen. Here, it is possible to adjust the size of the region of interest based on relationship between the detected user related object for gesture and the screen, to have the size larger if the distance is longer or smaller if the distance is shorter. It is not necessary to obtain the absolute or actual distance between the detected user related object for gesture and the screen. In fact, a single camera which is able to detect whether the detected user related object is closer or farther by the fact that a size of an image of the user related object changes may be sufficient to provide the association for adjusting the scale of the region of interest. Through this process described, it is possible to display the region of interest with the calculated scale at the calculated coordinate on the screen as described in step S1050. As the hand or user related object is moved and the distance with the screen changes, the same steps are executed and results as illustrated in FIGS. 6 and 7 are obtained. There is no particular order whether the region becomes smaller or larger, and it is possible that the movement is from the hand being closer to the screen to the hand being farther to the screen which results in having the region larger, or alternatively, the hand located far from the screen can be moved closer to the screen which causes the region to be smaller. However, it is possible that all predetermined menu items are displayed in full in a menu function to begin with by default.

Figure 11:
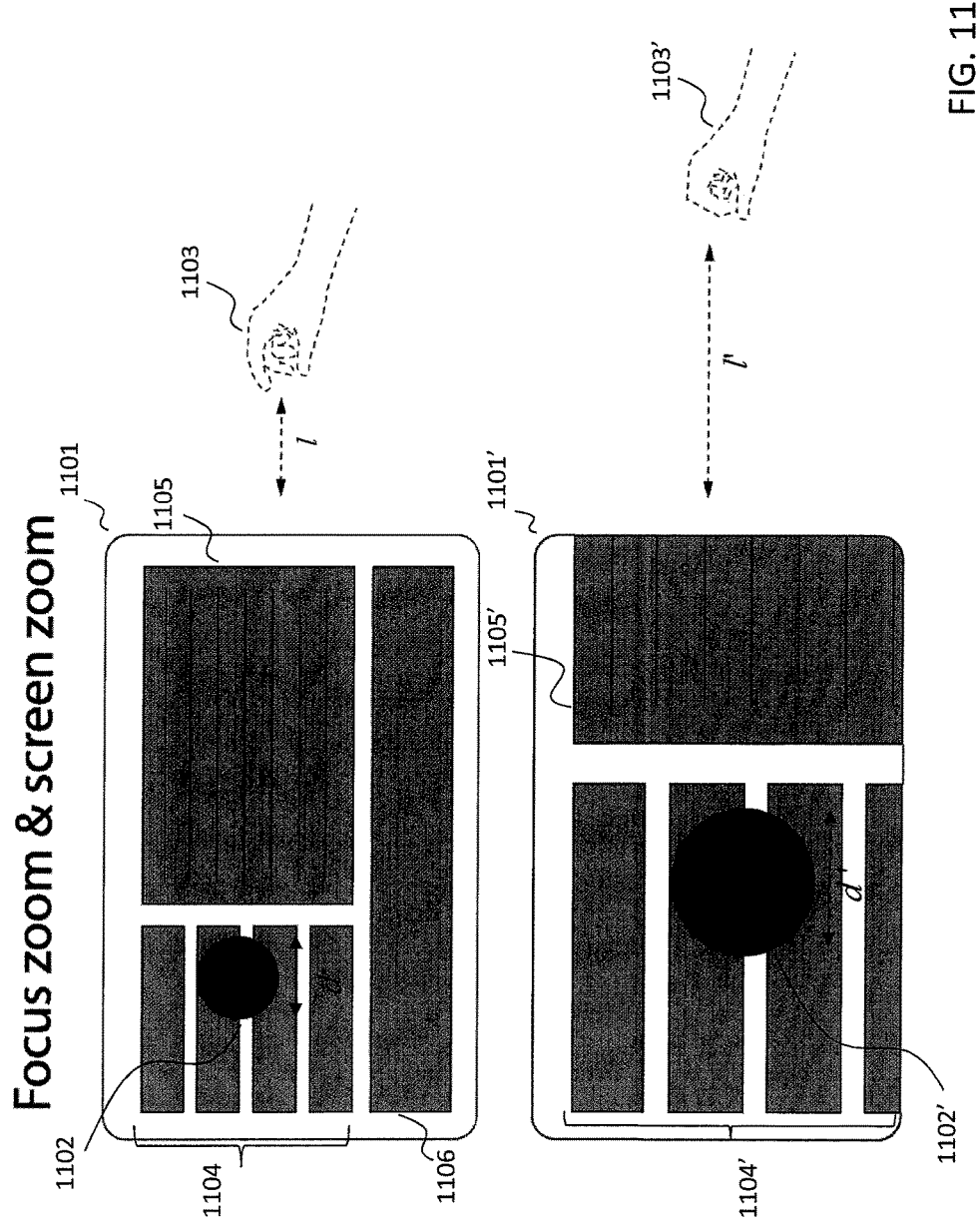
FIG. 11 illustrates combinations of front views and hand gestures of one embodiment of the infotainment system in the vehicle with a focus zoom and screen zoom function on a menu, depending on a distance between the screen and a gesture object.

FIG. 11 includes front views and side views of an example menu screen of one embodiment of an infotainment system with a focus zoom and screen zoom function which allows a user to zoom in and out the menu screen and to point an object on the menu screen, in particular, depicting relationships among a size of a pointer and a scale of menu items on the menu screen, and a distance between the screen and a hand pointing the screen based on two different distances. As shown in FIG. 11, a pointer 1102 and menu items 1104, 1105, and 1106 are displayed on a menu screen 1101. When a user makes a predetermined gesture which confirms a location of a gesture action of an object 1103 to determine a region and changes a distance between an object 1103' and the menu screen 1101' to l', longer than l, the determined region is zoomed in and displayed in the screen 1101', as well as a diameter of the pointer 1102' becomes d' which is also longer than the diameter d, accordingly. In FIG. 11, the sample object is a hand of a user, however, it is not limited to the user's hand. For example, if the above predetermined gesture is recognized by one or more sensors, such as a camera, of an infotainment system (see FIG. 8), the infotainment system interprets the predetermined gesture as an intention of the user to control the scale of the menu screen 1101 and is able to determine the region of zoomed in items based on the position of the object 1103 as well as an intention of the user to control the size of the pointer 1102. Thus the infotainment system is able to display the selected region including items 1104, 1105 and 1106 as well as the pointer 1102 at a position on the menu screen 1101 corresponding with a horizontal and vertical position of the object 1103 with a diameter d corresponding with the distance l between the object 1103 and the menu screen 1101. If the distance between the distance between the object 1102' and the menu screen 1101' becomes l' which is longer than l, the infotainment system is able to display the selected region including a portion of item 1104' and an item 1105' as well as the pointer 1102' at a position on the menu screen 1101' corresponding with a horizontal and vertical position of the object 1103' with a diameter d' corresponding with the distance l'. As shown in FIG. 11, the pointer 1102 with the diameter d is on the item 1104 and the pointer 1102' with the diameter d' is on the item 1104' similarly, because the pointer and the items are zoomed in simultaneously at the same scale change. Thus, by controlling the distance of the object from the menu screen, it is possible to control the size of the pointer and the region of menu items including potential selection items with a simple sequence of gestures, such as "grabbing and moving forward or backward", unlike typical cursors which tend to require a user to use scale bars or zoom + and − buttons away from the cursor location in order to zoom in and out the menu screen.

Figure 12:
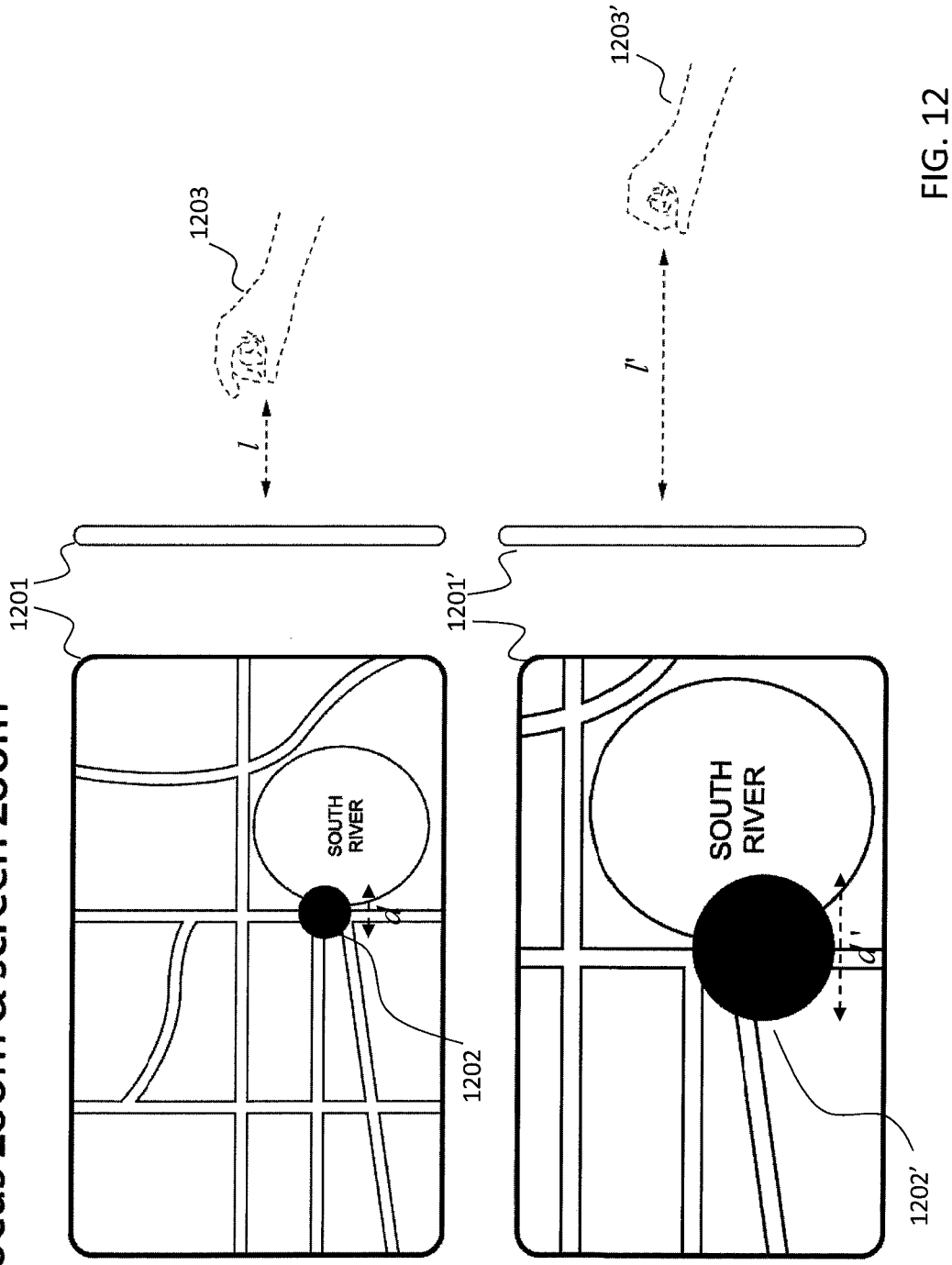
FIG. 12 illustrates combinations of front views and hand gestures of one embodiment of the infotainment system in the vehicle with a focus zoom and screen zoom function on a map, depending on a distance between the screen and a gesture object.

FIG. 12 includes front views and side views of an example map screen of one embodiment of an infotainment system with a focus zoom and screen zoom function which allows a user to zoom in and out the map screen and to point an object on the map screen, in particular, depicting with relationships among a size of a pointer and a scale of map items on the map screen, and a distance between the screen and a hand pointing the screen based on two different distances. As shown in FIG. 12, a pointer 1202 is displayed on a map screen 1201, when a distance between an object 1203 and the map screen 1201 is l, a diameter of the pointer 1203 is d. When a user makes a predetermined gesture which confirms a location of a gesture action of an object 1203 to determine a region to be zoomed in or out in the map screen 1201 and then changes a distance between an object 1203' and the map screen 1201' to l', longer than l, the determined region is zoomed in and displayed in the screen 1201', as well as a diameter of the pointer 1202' becomes d' which is also longer than the diameter of the pointer 1202 d, accordingly. In FIG. 12, the sample object is a hand of a user, however, it is not limited to the user's hand. For example, if the above predetermined gesture is recognized by one or more sensors, such as a camera, of an infotainment system (not shown), the infotainment system interprets the predetermined gesture as an intention of the user to control the scale of the map screen 1201 and is able to determine the region of zoomed in items based on the position of the object 1203 as well as an intention of the user to control the size of the pointer 1202. Thus the infotainment system is able to display the selected region as well as the pointer 1202 at a position on the map screen 1201 corresponding with a horizontal and vertical position of the object 1203 with a diameter d corresponding with the distance l between the object 1203 and the map screen 1201. If the distance between the distance between the object 1203' and the menu screen 1201' becomes l' which is longer than l, the infotainment system is able to display the pointer 1202' at a position on the menu screen 1201' as well as the selected region including the pointer 1202' corresponding with a horizontal and vertical position of the object 1103' with a diameter d' corresponding with the distance l'.

As shown in FIG. 12, the pointer 1202 with the diameter d covers SOUTH RIVER and two intersections on its left and the pointer 1202' with the diameter d' is covers SOUTH RIVER and two intersections on its left similarly, because the pointer and the region covering SOUTH RIVER and two intersections are zoomed in simultaneously at the same scale change. Thus, by controlling the distance of the object from the map screen, it is possible to control the size of the pointer and the map region to be covered including potential selection region and to select a larger or smaller region in a map with a simple sequence of gestures, such as "grabbing and moving forward or backward", unlike typical cursors which tend to require a user to use scale bars or zoom + and − buttons away from the cursor location in order to zoom in and out the map screen while restricting a pointer to have a predetermined size.

Figure 13:
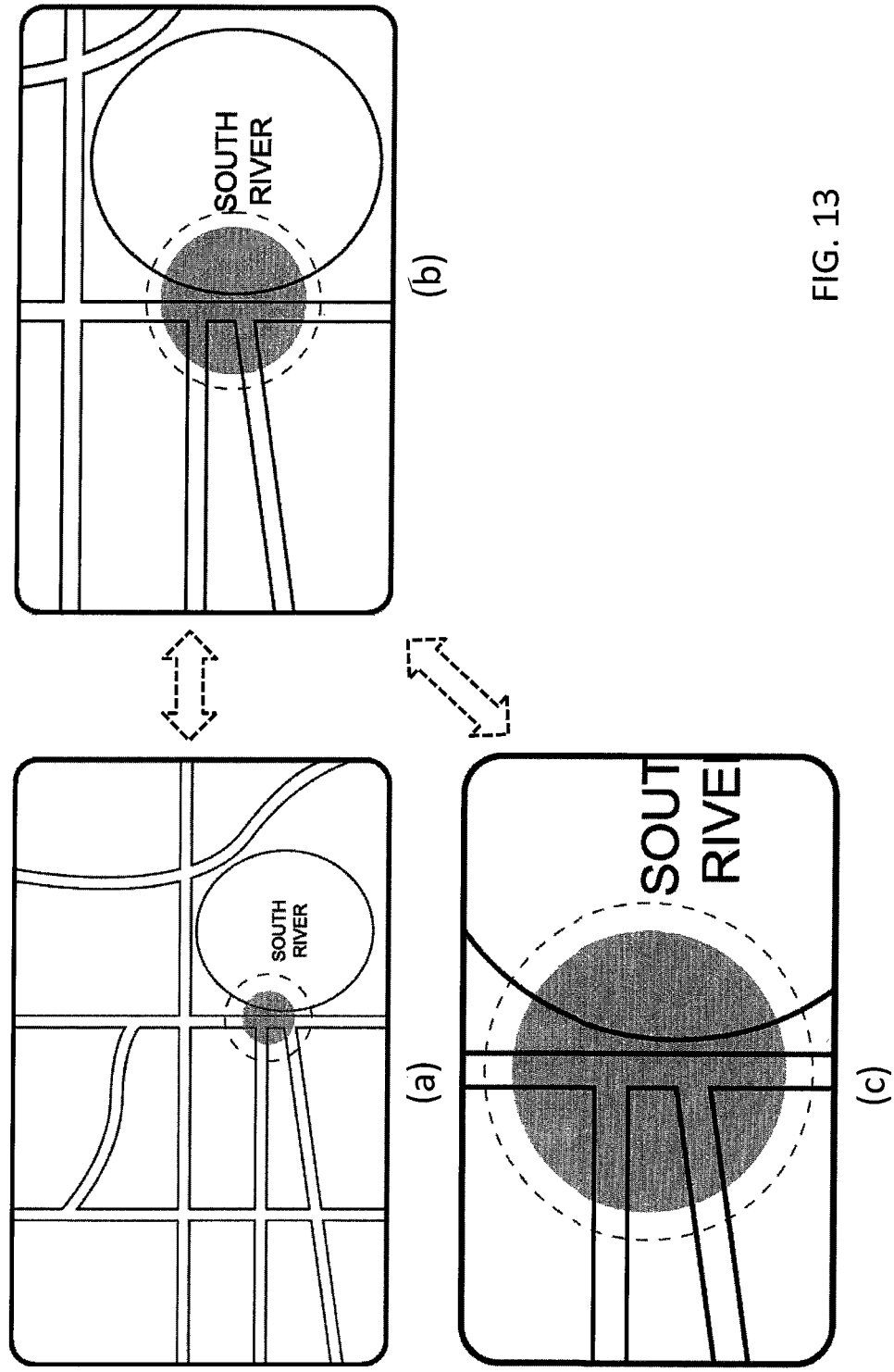
FIG. 13 is an example of a screen zoom in and out function that is able to accommodate reversible changes of a pointer size and a map scale in a map screen.

FIG. 13 illustrates that the screen zoom in and out function may accommodate reversible changes of a pointer size and a map scale in the map screen. For example, after having a sequence of gestures such as grabbing and moving a controlling object backward, the map screen will change its map scale and the size of the pointer from (a) to (b) and to (c), continually. On the other hand, after having a sequence of gestures such as grabbing and moving the controlling object forward, the map screen will change its map scale and the size of the pointer reversibly, from (c), (b) and to (a). It is possible to stop at the map scale and change of the pointer size in between (a), (b) or (c), according to a distance between the controlling object and the screen, when the gesture of moving backward or forward is paused.

Figure 14:
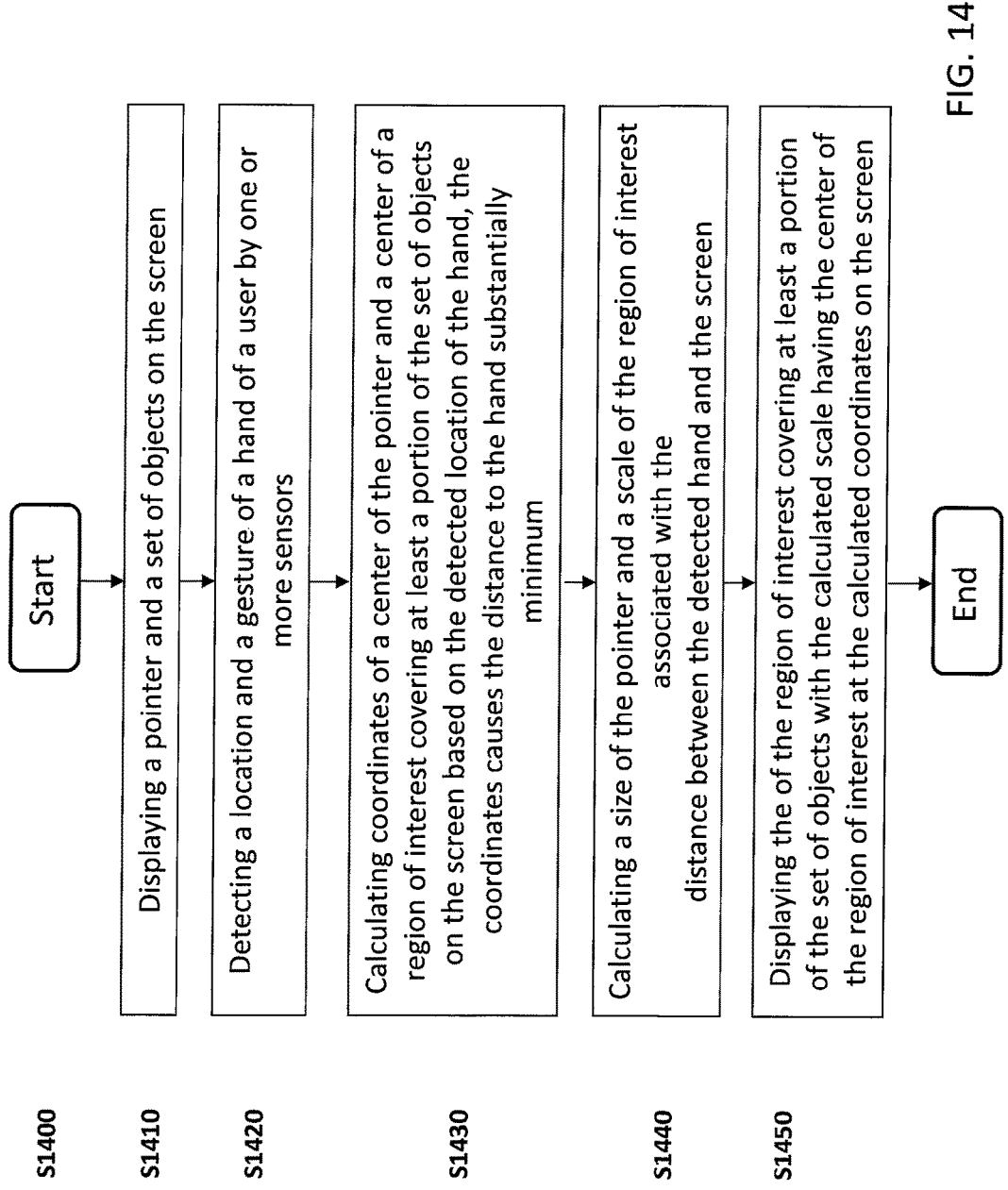
FIG. 14 is a flow chart of pointing an object on a screen with the screen zoom function according to one embodiment related to a combination of focus zoom and screen zoom functions.

FIG. 14 is a flow chart of a procedure of the method of pointing an object on a screen according to one embodiment related to a combination of focus zoom and screen zoom functions. In step S1410, an infotainment system displays a pointer and objects on the screen. The objects on the screen may be menu components illustrated in FIG. 11 or map items illustrated in FIG. 12, but not limited to these examples, any display items can be overlaid on the screen. While the pointer and the objects are being displayed on the screen, the infotainment system also starts detecting a location and a gesture of a second object related to a user by at least one sensor as described in step S1420. The gesture may be indicative of intent of the user to control the pointer and a region of interest covering at least a portion of the set of objects on the screen. Typically, the object related to a user is a user's hand but any other object which can represent a gesture of the user may be used. In case of using atypical object of the user, such as a stick, a physical pointer, another part of the user's body, etc., may be used as long as the atypical object is somehow registered or sensed for learning by the sensor prior to its actual use. The at least one sensor can be either a camera, or a proximity sensor, such as a projected capacitive touch sensor without direct touch, photoelectric sensor, thermo-sensor, radar, or ultrasonic sensor attached to or remotely located from the screen, a gyro and accelerometer attached to the object of the user for sensing the movement of the object for detection of relative position change, and so on. In step S1430, coordinates of a center of the pointer and a center of the region of interest is calculated based on the detected location of the hand or the user related object for gesture. Here, the distance between the center of the region of interest and the user related object becomes substantially shortest and thus is the distance between the screen and the user related object for gesture. In step S1440, a size of the pointer and a scale of the region of interest are also calculated in association with the distance between the detected user related object for gesture and the screen. Here, it is possible to adjust the size of the pointer and the scale of the region of interest based on relationship between the detected user related object for gesture and the screen, to have the scale and size larger if the distance is longer or smaller if the distance is shorter. It is not necessary to obtain the absolute or actual distance between the detected user related object for gesture and the screen. In fact, a single camera which is able to detect whether the detected user related object is closer or farther by the fact that a size of an image of the user related object changes may be sufficient to provide the association for adjusting the size of the pointer and the scale of the region of interest. Through this process described, it is possible to display the region of interest with the calculated scale at the calculated coordinate on the screen as described in step S1450. As the hand or user related object is moved and the distance with the screen changes, the same steps are executed and results as illustrated in FIGS. 11 and 12 are obtained. There is no particular order whether the region becomes smaller or larger, and it is possible that the movement is from the hand being closer to the screen to the hand being farther to the screen which results in having the region larger, or alternatively, the hand located far from the screen can be moved closer to the screen which causes the region to be smaller. However, it is possible that all predetermined menu items are displayed in full in a menu function to begin with by default.

Figure 15A:
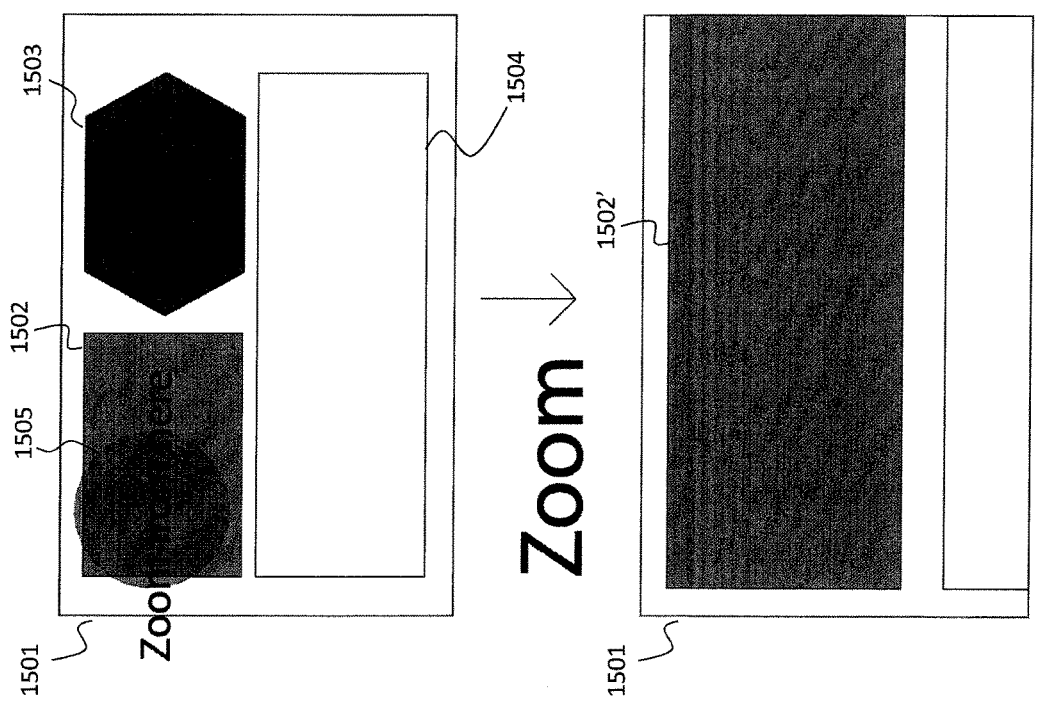
Figure 15B:
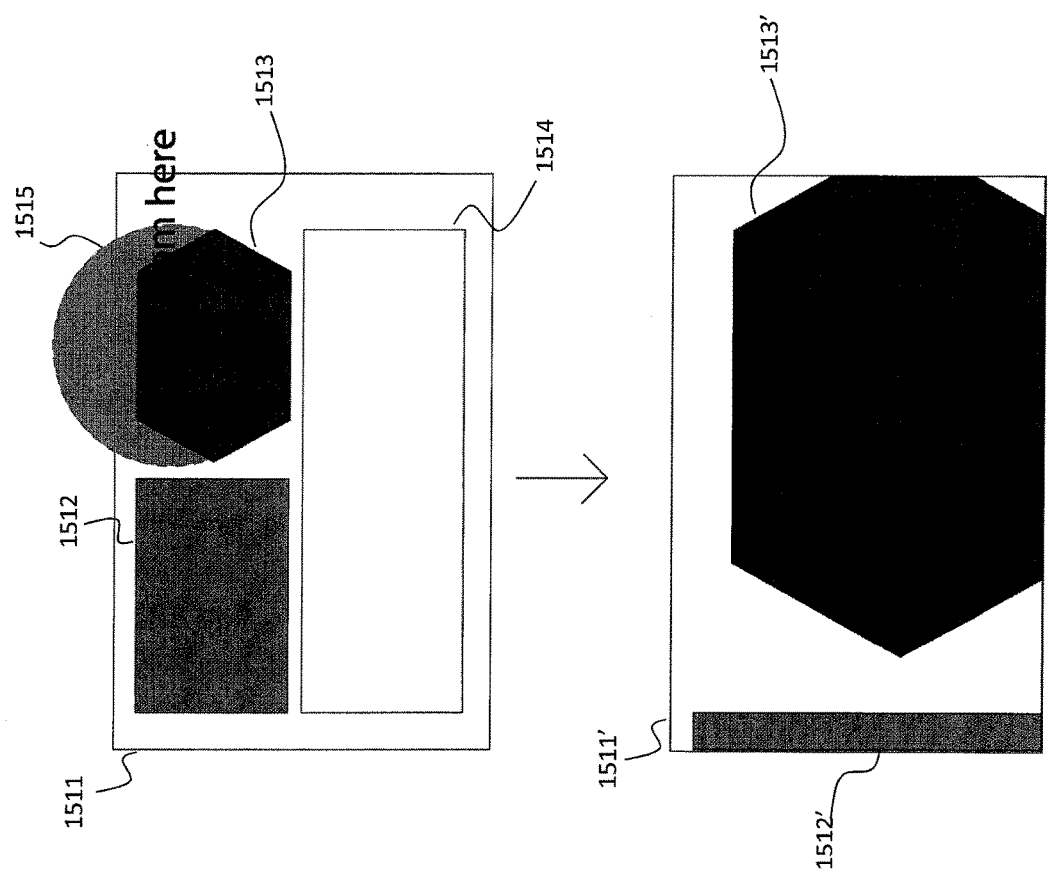

FIGS. 15 (a)-(c) are examples of the screen zoom function. As illustrated in FIG. 15(a) when a location of a hand (not shown) is close to a region of interest 1505 overlaid on an object 1502 on a screen 1501 without any overlapping region with objects 1503 and 1504, a left end of the object 1502 is focused and the zoom in screen 1501' shows the object after focus 1502'. Here, due to an aspect of the screen 1501', the top left end of object 1504' may be included in the screen 1501'. On the other hand, as illustrated in FIG. 15(b) when a location of a hand (not shown) is close to a region of interest 1515 overlaid on an object 1513 on a screen 1511 without any overlapping region with objects 1512 and 1514, a left most of the object 1513 is focused and the zoom in screen 1511' shows the object after focus 1513'. Here, due to an aspect of the screen 1511', the right end of object 1512' may be included in the screen 1511'. As illustrated in FIG. 15(c) when a location of a hand (not shown) is close to a region of interest 1525 overlaid on an object 1524 on a screen 1521 without any overlapping region with objects 1522 and 1523, a right end of the object 1524 is focused and the zoom in screen 1521' shows the object after focus 1524'.

FIG. 16 illustrates one embodiment where one or more items among a plurality of items may be focused for selection using a focus zoom function. Initially, as shown in FIG. 16(a), icons or buttons representing applications such as "Menu", "Navi", "Music", "Radio", "App", "Media", "Car", and "Setting" can be listed. They are merely examples and not limited to these. In fact, "Music", "Radio" and "Media" may be mixed. It is possible to categorize menu items differently, to optimize interface according to a vehicle and system functionality. Once a user executes predetermined gesture, such as pulling, by moving a hand of the user with intent to control the application screen, a pointer appears, increasing its size as shown in FIG. 16(b) where "Menu" is the only item focused by the pointer. Further gesture of pulling the hand by the user, the size of the pointer increases further as well as shown in FIG. 16(c), where "Menu" and "Navi" can be focused for selection by the pointer. By pulling the hand further and shifting to focus the center of the screen, the pointer moves to the center of the screen and the size of the pointer increases even further as shown in FIG. 16(d), where "Navi", "Music", "Media" and "Car" are focused for potential selection. Here, merely the pointer becomes larger by the gesture while the screen scale is kept the same.

Figure 17:
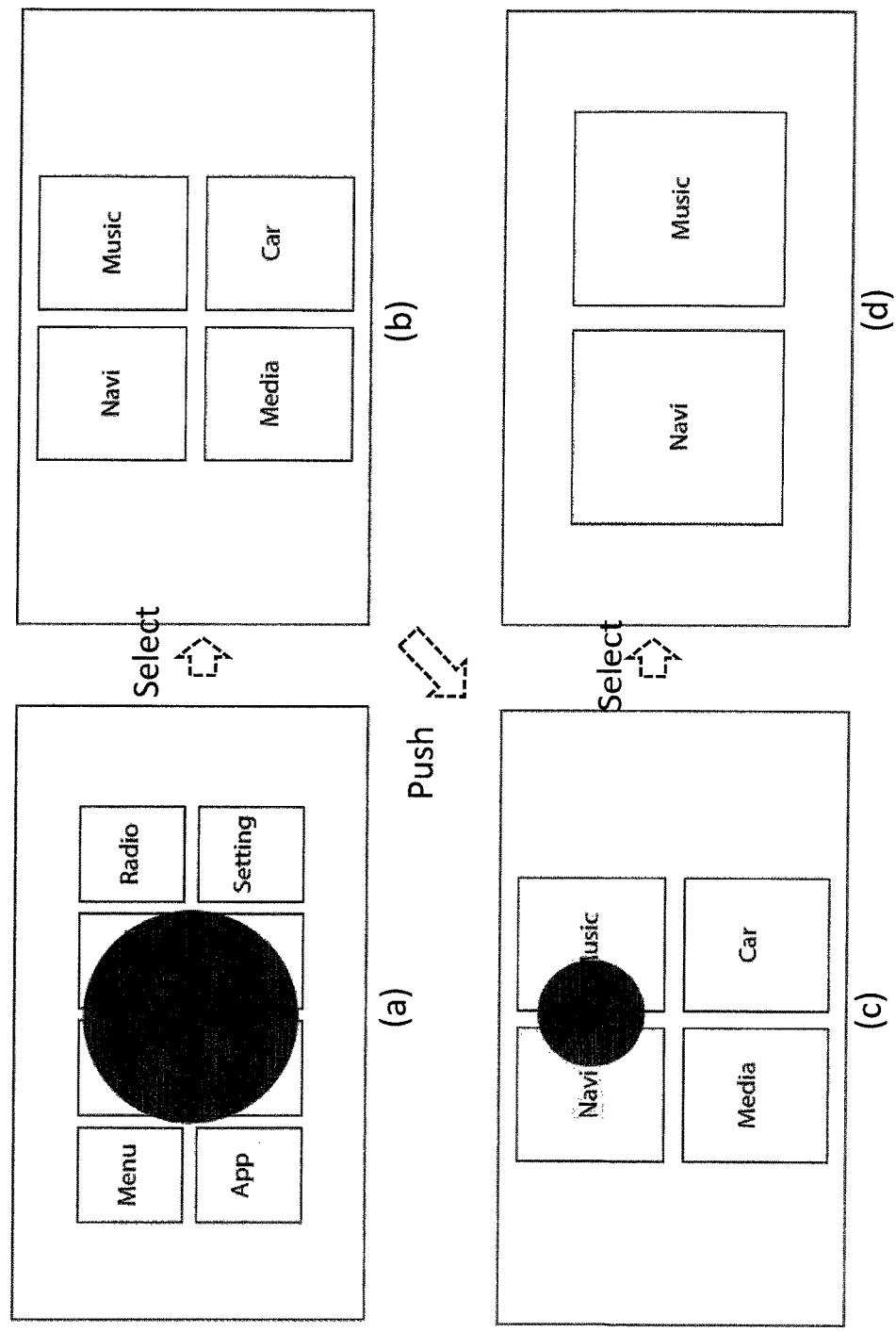

FIG. 17 illustrates another embodiment where one or more items among a plurality of items may be focused and selected using a focus zoom function. Initially, as shown in FIG. 17(a), icons or buttons representing applications such as "Menu", "Navi", "Music", "Radio", "App", "Media", "Car" and "Setting" can be listed and a pointer may be focusing applications on the center of the screen, "Navi", "Music", "Media" and "Car". Once a user executes a predetermined gesture for confirmation, such as grabbing with a hand of the user with intent to select the focused items on the screen, buttons for "Navi", "Music", "Media" and "Car" are displayed in a larger scale as shown in FIG. 17(b). By moving the hand closer to the screen and shifting to focus two items above the center of the screen, the pointer moves above the center of the screen and the size of the pointer decreases as shown in FIG. 17(c), where buttons for "Navi" and "Music" are focused for potential selection. When the user executes the predetermined gesture, such as grabbing, for confirmation one more time with intent to select the focused items on the screen, buttons for "Navi" and "Music" are displayed in a larger scale as shown in FIG. 17(d). As illustrated, a plurality of items can be focused and selected among a full set of items. Thus, it is possible to narrow down items for selection rather than selecting one item from a plurality of items in a vehicle setting where a glance period for a vehicle infotainment system is limited and pinpointing one item out of a plurality of items is difficult.

Figure 18:
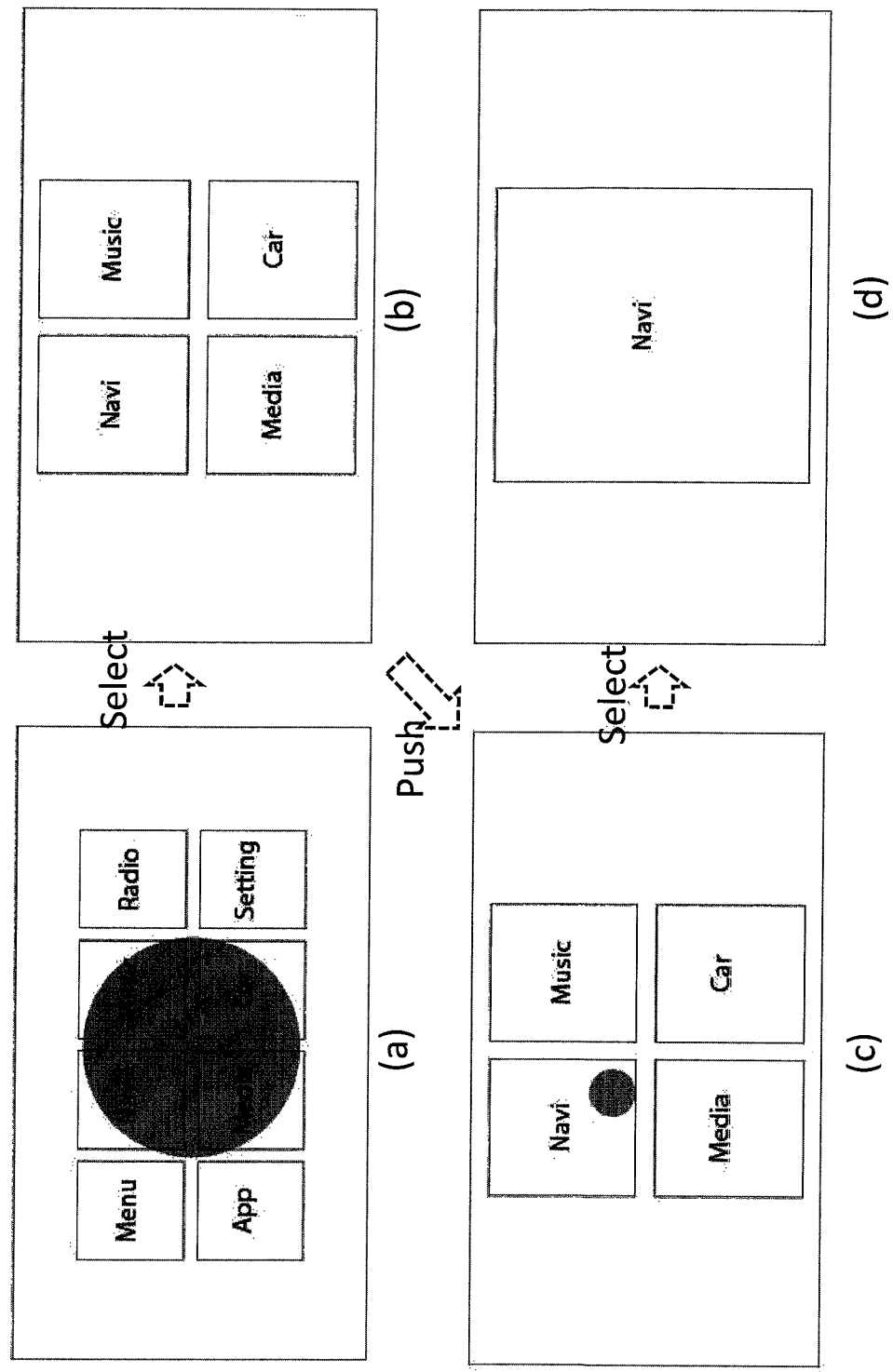

FIG. 18 illustrates another embodiment where one item among a plurality of items may be focused and selected using steps of a focus zoom function. Initially, as shown in FIG. 18(a), icons or buttons representing applications such as "Menu", "Navi", "Music", "Radio", "App", "Media", "Car" and "Setting" can be listed and a pointer may be focusing applications on the center of the screen, "Navi", "Music", "Media" and "Car". Once a user executes a predetermined gesture for confirmation, such as grabbing with a hand of the user with intent to select the focused items on the screen, buttons for "Navi", "Music", "Media" and "Car" are displayed in a larger scale as shown in FIG. 18(b). By moving the hand very close to the screen and shifting to focus one item "Navi", the pointer moves on the button "Navi" on the screen and the size of the pointer decreases to be within the region of "Navi" button as shown in FIG. 18(c), where the button for "Navi" is focused for potential selection. When the user executes the predetermined gesture again, such as grabbing, for one more confirmation of the intent to select the focused items on the screen, the button for "Navi" is displayed in a largest scale as shown in FIG. 18(d). As illustrated, a plurality of items can be focused and selected among a full set of items. At the same time, when the user is able to move the hand with proximity to the target icon or button, it is possible to directly choose one item related to the target icon or button by focusing and confirming the target icon or button. Thus, it is possible to directly choose a target item for selection from a plurality of items when a user is allowed to concentrate on controlling a vehicle infotainment system, such as when the vehicle is parked, etc.

Figure 19:
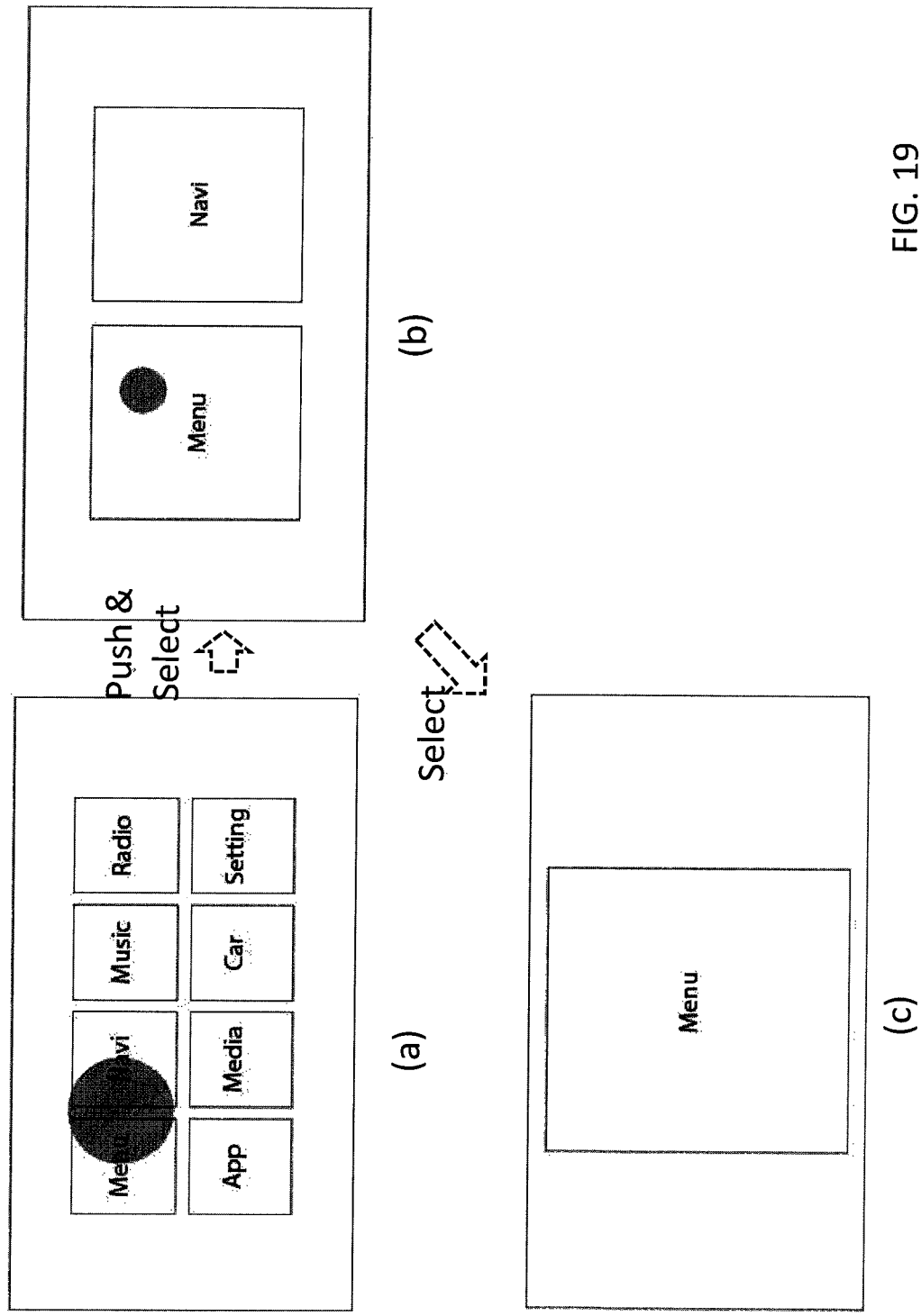

FIG. 19 illustrates another embodiment where one item among a plurality of items may be focused and selected using steps of a focus zoom function. Initially, as shown in FIG. 19(a), icons or buttons representing applications such as "Menu", "Navi", "Music", "Radio", "App", "Media", "Car" and "Setting" can be listed and a pointer may be focusing applications on the center of the screen, "Menu" and "Navi". Once a user executes a predetermined gesture for confirmation, such as grabbing with a hand of the user with intent to select the focused items on the screen, buttons for "Menu" and "Navi" are displayed in a larger scale as shown in FIG. 19(b) and the button "Menu" is focused by the pointer. By executing the predetermined gesture again, such as grabbing, for one more confirmation of the intent to select the focused item on the screen, the button for "Navi" is displayed in a largest scale as shown in FIG. 19(c).

As seen in FIGS. 16-19, it is possible to select items by having a pointer larger to select fewer items than all the items on the screen by taking steps or having a smaller pointer to directly select a target item. By using this size flexible pointer, it is possible to accommodate both selection strategies without any hardware modification.

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

The invention claimed is:

1. A method of pointing a first object on a screen of an infotainment system, the method comprising:
 displaying the first object on the screen, wherein the first object includes a pointer;
 detecting a location of a second object related to a user and a first predetermined gesture executed by the second object by one or more sensors;
 interpreting the first predetermined gesture to determine if the first predetermined gesture is a grabbing gesture or an open hand gesture, wherein the grabbing gesture is to confirm the location of the second object for zooming operations on the first object other than the pointer, and the open hand gesture is for zooming operations on the pointer as the first object;
 calculating coordinates of a center of the first object on the screen based on the detected location of the second object, wherein the coordinates are configured to cause a distance between the center of the first object and the second object minimum;
 calculating a size of the first object associated with a distance between the detected location of second object and the screen;
 displaying the first object with the calculated size at the calculated coordinates on the screen; and
 detecting, by the one or more sensors, a second predetermined gesture executed by the second object as a confirmation of a function to be executed.

2. The method of pointing an object in the screen of claim 1, wherein the first object is a map image.

3. The method of pointing the object in the screen of claim 1, wherein the first object is an object of interest comprising one or more target objects.

4. The method of pointing the object in the screen of claim 1, wherein the first object is a region of interest and the size of the first object is associated with a display scale of the region of interest.

5. The method of pointing the object in the screen of claim 1, wherein the first object is a combination of the pointer and a region of interest and the size of the first object is associated with a combination of a size of the pointer and a display scale of the region of interest.

6. The method of pointing the object in the screen of claim 1, wherein at least one of the one or more sensors is a gesture sensor.

7. The method of pointing the object in the screen of claim 6, wherein the gesture sensor is at least one of a camera, a proximity sensor, such as a projected capacitive touch sensor without direct touch, photoelectric sensor, thermo-sensor, radar, ultrasonic sensor, a gyro and an accelerometer, attached to or remotely located from the screen.

8. The method of pointing the object in a screen of claim 1, wherein the function to be executed is a selection of a portion of the first object, further comprising:
 selecting the portion of the first object.

9. The method of pointing the object in the screen of claim 8, wherein a selection of one object is achieved by repetition of selecting the portion of the first object according to gesture change of the user.

10. An infotainment system that allows a user to point a first object on a screen, the system comprising:
 a screen configured to display the first object on the screen, wherein the first object includes a pointer;
 one or more gesture sensor configured to detect a location of a second object related to a user and a first predetermined gesture executed by the second object, and to interpret the first predetermined gesture to determine if the first predetermined gesture is a grabbing gesture or an open hand gesture, wherein the grabbing gesture is to confirm the location of the second object for zooming operations on the first object other than the pointer, and the open hand gesture is for zooming operations on the pointer as the first object, and wherein the gesture sensor is further configured to detect a second predetermined gesture as a confirmation of a function to be executed; and
 a processor configured to calculate coordinates of a center of the first object on the screen based on the detected location of the second object, wherein the coordinates are configured to cause a distance between the center of the first object and the second object minimum,
 wherein the processor is further configured to calculate a size of the first object associated with a distance between the detected location of second object and the screen and to display the first object with the calculated size at the calculated coordinates on the screen.

11. The infotainment system of claim 10, wherein the first object is a map image.

12. The infotainment system of claim 10, wherein the first object is an object of interest comprising one or more target objects.

13. The infotainment system of claim 10, wherein the first object is a region of interest and the size of the first object is associated with a display scale of the region of interest.

14. The infotainment system of claim 10, wherein the first object is a combination of the pointer and a region of interest and the size of the first object is associated with a combination of a size of the pointer and a display scale of the region of interest.

15. The infotainment system of claim 10, wherein at least one of the one or more sensors is a gesture sensor.

16. The infotainment system of claim 15, wherein the gesture sensor is at least one of a camera, a proximity sensor, such as a projected capacitive touch sensor without direct touch, photoelectric sensor, thermo-sensor, radar, ultrasonic sensor, a gyro and an accelerometer, attached to or remotely located from the screen.

17. The infotainment system of claim 10, wherein the function to be executed is a selection of a portion of the first object, further comprising:

selecting the portion of the first object.

18. The infotainment system of claim 17, wherein a selection of one object is achieved by repetition of allowing a user to select the portion of the first object according to gesture change of the user.

* * * * *